(12) United States Patent
Campbell et al.

(10) Patent No.: US 11,606,270 B2
(45) Date of Patent: *Mar. 14, 2023

(54) MONITORING USER EXPERIENCE USING DATA BLOCKS FOR SECURE DATA ACCESS

(71) Applicant: CloudFit Software, LLC, Redmond, WA (US)

(72) Inventors: Chad Campbell, Whitestown, IN (US); Carroll Wayne Moon, Lynchburg, VA (US); Christopher James Carlson, Denton, TX (US); Jeremy David Sublett, Louisville, KY (US); Paul O'Hara, Orlando, FL (US); David Ray Garza, Lynchburg, VA (US); David James Weatherford, San Diego, CA (US); Jason Aaron Graham, Elizabethtown, KY (US); Jon Matthew Loflin, Knoxville, TN (US); Kyle Wagner, Redmond, WA (US)

(73) Assignee: CloudFit Software, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,775

(22) Filed: Apr. 19, 2021

(65) Prior Publication Data

US 2021/0243090 A1 Aug. 5, 2021

Related U.S. Application Data

(63) Continuation of application No. 16/718,107, filed on Dec. 17, 2019, now Pat. No. 11,012,326.

(51) Int. Cl.
*H04L 41/5067* (2022.01)
*H04L 9/40* (2022.01)
(Continued)

(52) U.S. Cl.
CPC .......... *H04L 41/5067* (2013.01); *G06F 9/547* (2013.01); *G06F 11/3006* (2013.01);
(Continued)

(58) Field of Classification Search
CPC ............ H04L 41/5067; H04L 41/0613; H04L 41/0645; H04L 43/0817; H04L 63/102;
(Continued)

(56) References Cited

U.S. PATENT DOCUMENTS 5,048,085 A 9/1991 Abraham et al.
5,148,481 A 9/1992 Abraham et al.
(Continued)

FOREIGN PATENT DOCUMENTS

WO WO2019/0149471 A1 8/2019

OTHER PUBLICATIONS

Final Office Action dated Sep. 8, 2020 for U.S. Appl. No. 16/718,107, "Monitoring User Experience Using Data Blocks for Secure Data Access", Campbell, 25 pages.
(Continued)

*Primary Examiner* — Jerry B Dennison
(74) *Attorney, Agent, or Firm* — Lee & Hayes, P.C.

(57) ABSTRACT

Techniques for enabling secure access to data using data blocks is described. Computing device(s) can provide instruction(s) to a component associated with an entity, wherein the instruction(s) are associated with an identifier corresponding to a data block of a plurality of data blocks. The computing device(s) can receive, from the component, data associated with the component, wherein the data is associated with the identifier and is indicative of a state of the component. The computing device(s) can store the data in the data block and monitor, using rule(s), changes to the state of the component based at least partly on the data in the data block. As a result, techniques described herein enable (Continued)

near real-time—and in some examples, automatic—reporting and/or remediation for correcting changes to the state of the component using data that is securely accessed by use of data blocks.

20 Claims, 9 Drawing Sheets

(51) Int. Cl.
| | |
|---|---|
| *H04W 12/08* | (2021.01) |
| *G06F 11/30* | (2006.01) |
| *G06F 9/54* | (2006.01) |
| *H04L 41/0604* | (2022.01) |
| *H04L 43/0817* | (2022.01) |
| *H04L 41/0631* | (2022.01) |

(52) U.S. Cl.
CPC ...... *H04L 41/0613* (2013.01); *H04L 41/0645* (2013.01); *H04L 43/0817* (2013.01); *H04L 63/102* (2013.01); *H04L 63/20* (2013.01); *H04W 12/08* (2013.01); *G06F 2201/86* (2013.01); *G06F 2201/875* (2013.01)

(58) Field of Classification Search
CPC ...... H04L 63/20; G06F 9/547; G06F 11/3006; G06F 2201/86; G06F 2201/875; H04W 12/08
See application file for complete search history.

(56) References Cited

U.S. PATENT DOCUMENTS

| | | | |
|---|---|---|---|
| 6,138,249 A | 10/2000 | Nolet | |
| 6,438,592 B1 | 8/2002 | Killian | |
| 6,795,798 B2 | 9/2004 | Eryurek et al. | |
| 6,983,317 B1 | 1/2006 | Bishop et al. | |
| 7,197,559 B2 | 3/2007 | Goldstein et al. | |
| 7,299,277 B1 | 11/2007 | Moran et al. | |
| 7,475,130 B2 | 1/2009 | Silverman | |
| 7,660,902 B2 | 2/2010 | Graham et al. | |
| 7,669,085 B2 | 2/2010 | Alam et al. | |
| 8,719,814 B2 | 5/2014 | Wookey | |
| 8,832,268 B1 | 9/2014 | Chheda et al. | |
| 8,910,278 B2 | 12/2014 | Davne et al. | |
| 9,098,333 B1 | 8/2015 | Obrecht et al. | |
| 9,137,110 B1 | 9/2015 | Adogla et al. | |
| 9,215,158 B1 | 12/2015 | Adogla et al. | |
| 9,219,648 B1 | 12/2015 | Chheda et al. | |
| 9,619,772 B1 | 4/2017 | Adogla et al. | |
| 9,628,486 B2 | 4/2017 | Wang et al. | |
| 9,741,005 B1 | 8/2017 | Adogla et al. | |
| 9,930,423 B1* | 3/2018 | Sevindik | H04N 21/44209 |
| 10,193,953 B2 | 1/2019 | Wu et al. | |
| 10,346,454 B2 | 7/2019 | Moeller-Bertram et al. | |
| 10,447,718 B2 | 10/2019 | Ford | |
| 10,467,426 B1 | 11/2019 | Esposito et al. | |
| 10,498,605 B2 | 12/2019 | Weith et al. | |
| 10,521,235 B1 | 12/2019 | Balasubramanian et al. | |
| 10,659,325 B2 | 5/2020 | Dam et al. | |
| 10,671,520 B1 | 6/2020 | Rodrigues et al. | |
| 10,698,715 B2 | 6/2020 | Inbaraj et al. | |
| 10,708,149 B2 | 7/2020 | Wu et al. | |
| 10,805,185 B2 | 10/2020 | Kolar et al. | |
| 10,877,867 B1* | 12/2020 | Campbell | G06F 11/328 |
| 10,963,347 B1* | 3/2021 | Chen | G06F 12/0802 |
| 11,100,232 B1* | 8/2021 | Juncker | H04L 63/102 |
| 11,191,896 B2* | 12/2021 | Palerm | G16H 20/17 |
| 11,297,024 B1* | 4/2022 | Madan | H04L 51/046 |
| 2003/0115447 A1 | 6/2003 | Pham et al. | |
| 2005/0198525 A1 | 9/2005 | Trossen et al. | |
| 2005/0235058 A1 | 10/2005 | Rackus et al. | |
| 2008/0276319 A1* | 11/2008 | Rittermann | H04L 63/1425 726/23 |
| 2009/0276475 A1 | 11/2009 | Ramsey et al. | |
| 2012/0072985 A1 | 3/2012 | Davne et al. | |
| 2013/0042295 A1 | 2/2013 | Kelly et al. | |
| 2013/0232542 A1 | 9/2013 | Cheng et al. | |
| 2015/0149609 A1* | 5/2015 | Zou | G06F 11/3082 709/224 |
| 2016/0094560 A1* | 3/2016 | Stuntebeck | G06F 3/0481 726/1 |
| 2016/0119349 A1 | 4/2016 | Wang et al. | |
| 2016/0226731 A1 | 8/2016 | Maroulis | |
| 2017/0250892 A1* | 8/2017 | Cooper | G06F 21/552 |
| 2017/0269955 A1* | 9/2017 | Hardy | G06F 9/45558 |
| 2018/0027006 A1 | 1/2018 | Zimmermann et al. | |
| 2018/0027088 A1* | 1/2018 | Zou | H04L 67/566 709/224 |
| 2018/0198693 A1 | 7/2018 | Pathela | |
| 2018/0219909 A1* | 8/2018 | Gorodissky | H04L 43/50 |
| 2018/0278486 A1 | 9/2018 | Mermoud et al. | |
| 2018/0278570 A1* | 9/2018 | Dhanabalan | H04L 61/4511 |
| 2018/0375886 A1 | 12/2018 | Kirti et al. | |
| 2019/0028445 A1 | 1/2019 | McLaughlin et al. | |
| 2019/0098037 A1 | 3/2019 | Shenoy, Jr. et al. | |
| 2019/0306209 A1* | 10/2019 | Borghetti | H04L 67/02 |
| 2019/0318100 A1 | 10/2019 | Bhatia et al. | |
| 2020/0092374 A1* | 3/2020 | Mehta | G06F 11/0793 |
| 2020/0099590 A1 | 3/2020 | Mermoud et al. | |
| 2020/0127903 A1* | 4/2020 | Chintala | H04L 41/142 |
| 2020/0159607 A1 | 5/2020 | Piaseczny et al. | |
| 2020/0169457 A1 | 5/2020 | Xiao et al. | |
| 2020/0177481 A1* | 6/2020 | Venkatesh | G06F 11/0784 |
| 2020/0274783 A1* | 8/2020 | Sharma | H04L 41/046 |
| 2020/0334122 A1* | 10/2020 | Shepard | G06N 20/00 |
| 2020/0403855 A1 | 12/2020 | Sarood et al. | |
| 2021/0058859 A1* | 2/2021 | Henry | H04W 52/0206 |
| 2021/0173636 A1* | 6/2021 | Kolar | H04L 43/14 |
| 2021/0243090 A1* | 8/2021 | Campbell | H04L 63/102 |
| 2022/0100802 A1* | 3/2022 | Saini | G06F 16/28 |
| 2022/0108262 A1* | 4/2022 | Cella | G05B 19/41885 |
| 2022/0121509 A1* | 4/2022 | Jacob | G06F 11/004 |
| 2022/0138646 A1* | 5/2022 | Beaumont | G06Q 10/067 705/7.28 |
| 2022/0300392 A1* | 9/2022 | Biswas | G06F 11/3438 |
| 2022/0335136 A1* | 10/2022 | Sabourin | G06F 21/577 |

OTHER PUBLICATIONS

Non Final Office Action dated Mar. 20, 2020 for U.S. Appl. No. 16/718,083 "Monitoring User Experience for Cloud-Based Services" Campbell, 23 pages.

Non Final Office Action dated Mar. 25, 2020 for U.S. Appl. No. 16/718,107 "Secure Data Access Using Data Blocks" Campbell, 22 pages.

* cited by examiner

MONITORING USER EXPERIENCE USING DATA BLOCKS FOR SECURE DATA ACCESS

RELATED APPLICATIONS

This application is a continuation of and claims priority to U.S. patent application Ser. No. 16/718,107, field Dec. 17, 2019, the contents of which are incorporated by reference herein in their entirety.

BACKGROUND

Cloud-based service providers are companies that offer network services, infrastructure, and/or applications "in the cloud." Such services availed via the cloud are hosted by hundreds—if not thousands—of server computing devices and/or other data centers that can be accessed by users using network connectivity.

As companies move away from on-premise computing infrastructures to cloud-based computing infrastructures, where users are spread across hundreds of server computing devices, identifying and troubleshooting technology issues has become increasingly difficult. That is, with users spread across hundreds of server computing devices, information technology (IT) professionals cannot easily determine when there is an issue (e.g., affecting computer and/or network performance) and/or where the issue is located. This challenge is amplified when companies are using cloud-based services via cloud-based computing infrastructures. Thus, as companies move to cloud-based computing infrastructures and/or cloud-based services, technology issues can be frustrating and costly. Further, the lack of detection and/or access to remediation can negatively affect application, computer, network and/or customer performance (and thus experience).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
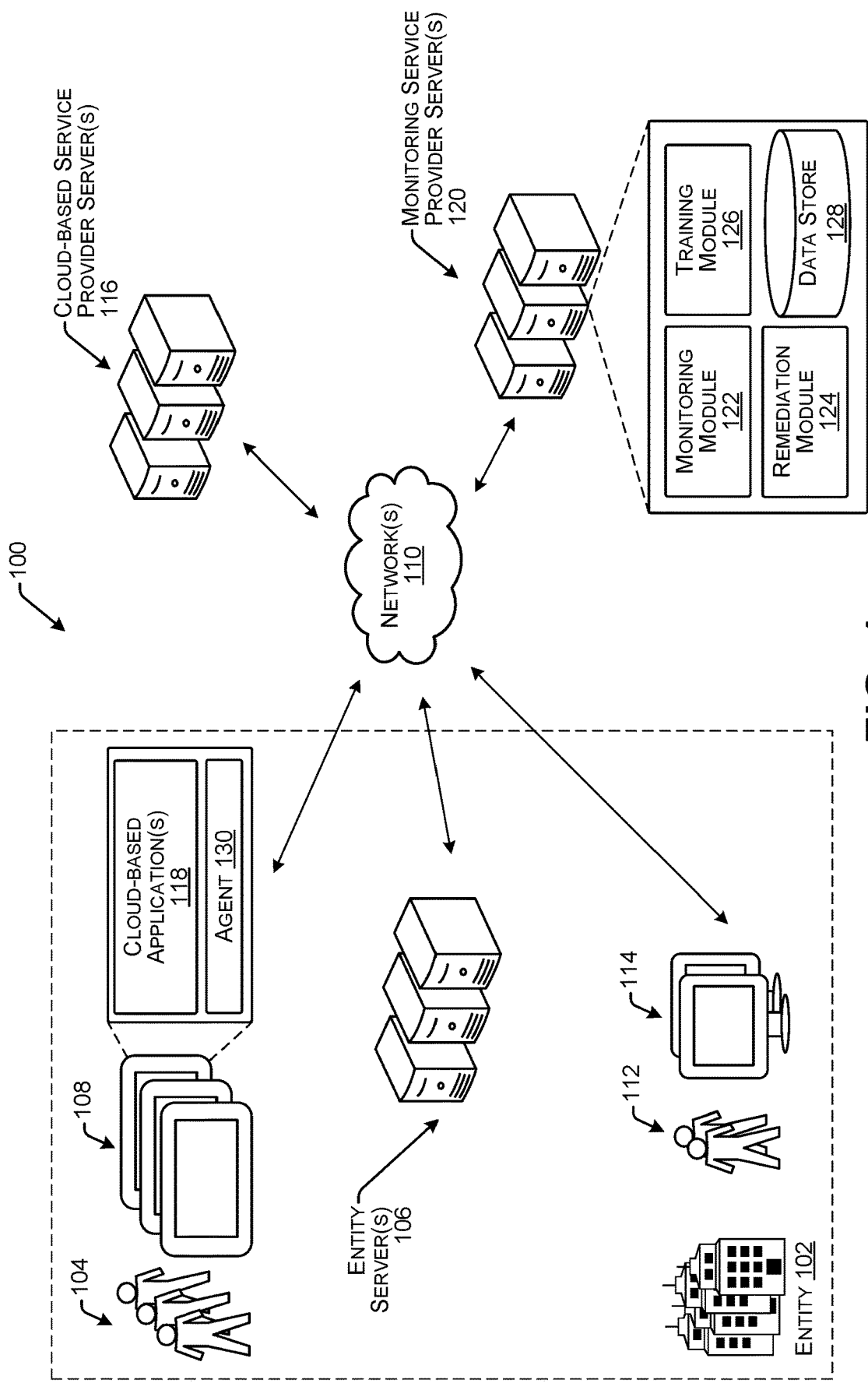
FIG. 1 illustrates an example environment for performing techniques described herein.

This disclosure describes techniques for monitoring user experiences of users using services of a cloud-based service provider via a computing infrastructure—including both cloud-based devices and/or on-premise devices—of a company, business, or other entity. That is, techniques described herein are directed to monitoring user experiences to identify issues with services of a cloud-based service provider and/or user devices accessing such services so that proactive and/or corrective actions can be performed to avoid issues that affect productivity and/or user satisfaction. In some examples, techniques described herein can monitor user experience by analyzing health details and/or other data that is regularly and/or securely received by a service provider providing (user experience) monitoring services from the user devices. In some examples, techniques described herein can provide near real-time reporting based on such analyzing. Techniques described herein therefore enable action to be performed to correct (or avoid) poor user experiences.

For any company who has a sizable workforce of users with user devices, such as laptops, desktops, mobile devices, etc., it is important that such users are productive with their technology. Such technology can add significant value to a company when users are productive. However, if technology is an impediment, users can get frustrated and companies can lose revenue. Therefore, companies invest significant resources into infrastructure for understanding the user experiences of their user bases. In some examples, companies hire teams of administrative professionals (e.g., information technology (IT) teams) to field questions or concerns regarding technology issues. In some examples, companies utilize software or other technology for troubleshooting technology issues.

When companies utilize on-premise computing infrastructures, identifying and troubleshooting technology issues is relatively easy. For instance, if a particular user is having issues with an email application, for example, an IT professional can locate which on-premise server computing device is causing the issue and can troubleshoot the issue. However, as companies move away from on-premise infrastructures to cloud-based computing infrastructures, where users are spread across hundreds of server computing devices (in addition to any on-premise computing devices), identifying and troubleshooting technology issues has become increasingly difficult. That is, with users spread across hundreds of server computing devices, IT professionals cannot easily determine when there is an issue and/or where the issue is located. For instance, if a particular business application associated with a cloud-based service provider (e.g., an email application, a teleconference application, etc.) is inoperable or is otherwise causing inefficiencies, an IT professional contacts the cloud-based service provider and waits until the cloud-based service provider can troubleshoot the issue, so that the IT professional can troubleshoot the issue within its own computing infrastructure. This delay can introduce frustration and can affect productivity. Furthermore, while the issue remains, user devices and/or the network can be negatively affected. Thus, as companies move to cloud-based computing infrastructures, technology issues can be frustrating and costly. Further, the lack of detection and/or access to remediation can negatively affect computer and/or network performance.

Techniques described herein enable companies and/or service providers associated with such companies to obtain data associated with user experience in near real-time to enable the companies and/or service providers to perform actions to correct (or avoid) poor user experiences that can negatively affect computer and/or network performance. In some examples, a service provider providing monitoring and/or remediation services can monitor inputs from one or more user devices running respective instances of a light weight agent (e.g., a program, having minimal code, provided by the service provider) to collect data indicative of experiences of the one or more users. Such data can indicate the health of the user devices and/or the services being provided by a cloud-based service provider. That is, such data can be indicative of the health of a system, application, network, etc. with which the one or more user devices are associated. In at least one example, the service provider (e.g., providing monitoring and/or remediation services) can access such data regularly and securely, and, in some examples, without accessing user-authored and/or user identifiable data. The service provider can analyze the inputs to determine if/when a state of a user device changes. In some examples, such a state can be indicative of user experience.

In some examples, the service provider can analyze the inputs in view of one or more rules to determine when to initiate and/or perform a remedial action with respect to a user device. Such rules can be configurable based on products/services (e.g., availed by cloud-based service provider(s)), companies, users (e.g., characteristics associated therewith), geographic location, time of day, date, and the like. In some examples, such rules can be determined intelligently, using machine learning techniques.

In at least one example, the service provider (e.g., providing monitoring and/or remediation services) can send a notification to a designated user (or group of users) to perform the remedial action. In other examples, the service provider can automatically perform the remedial action (e.g., without requiring input from a user, such as the designated user described above). As described above, techniques described herein enable the service provider to obtain data associated with user experience in near real-time to enable the service provider to perform preventative and/or corrective actions to mitigate poor user experiences.

As an example, a company can add a user device of an employee of the company to a subscription for the monitoring and/or remediation services offered by the service provider (e.g., via a portal provided by the service provider). In some examples, the employee can be an executive or other individual associated with a particular level of status or privilege. The company can provide, among other services, cloud-based services via a cloud-based computing infrastructure. For example, the company can provide a cloud-based email service, a cloud-based telecommunication service, etc. to enable the employee to perform duties associated with his or her employment. As described below, such cloud-based services can be monitored by the service provider providing aforementioned monitoring and/or remediation services (e.g., by virtue of the company subscribing to such services and adding the user device of the employee to its subscription).

In at least one example, to register the user device with the subscription of the company—and thus subject the user device to monitoring by the service provider—the user device can be added to a portal associated with the service provider and the service provider can cause a light weight agent (e.g., a program, having minimal code, provided by the service provider) to be downloaded on the user device. The light weight agent can run as a background process, sending health data and/or other data associated with the user device to the service provider (e.g., in near real-time, at substantially regular intervals, etc.).

In at least one example, the service provider can analyze the health data and/or other data to determine whether a cloud-based email service, among other cloud-based services, is performing properly. That is, the service provider can access a rule that pertains to operations of the cloud-based email service. In an example, if the health data and/or other data indicates that emails of the user associated with the user device are being held in an outbox, the service provider can send an email to IT personnel associated with the company (which may be prescribed by the rule). As such, the IT personnel can perform one or more actions to remedy the issue. In an alternate example, the service provider can automatically perform the one or more actions to remedy the issue (which may be alternately prescribed by the rule). This type of monitoring can enable the service provider and/or the company to perform action(s) to correct (or avoid) poor user experiences in an effort to ensure that the user is able to use his or her user device efficiently.

As another example, the service provider can analyze the health data and/or other data to determine that the user device has not provided health data and/or other data, or otherwise responded to the service provider, for more than a specified period of time. In such an example, the service provider can access a rule that pertains to online/offline monitoring. In this example, the health data and/or other data can indicate that the user device is offline. In such an example, the service provider can initiate a phone call to IT personnel associated with the company (which may be prescribed by the rule). As such, the IT personal can perform one or more actions to remedy the issue. In an alternate example, the service provider can automatically perform the one or more actions to remedy the issue (which may be alternately prescribed by the rule). This type of monitoring can enable the service provider and/or the company to perform action(s) to correct (or avoid) poor user experiences in an effort to ensure that the user is able to use his or her user device efficiently.

While email and online/offline monitoring scenarios are described above, as is described herein, any number of business and/or cloud-based application scenarios can be monitored by the service provider. In at least one example, rules associated with one or more business scenarios and/or one or more cloud-based application scenarios can be used for monitoring user experience as described herein. Additional details are described below.

Techniques described herein provide various technical advantages over existing and/or conventional monitoring technology. As described above, as companies move away from on-premise computing infrastructures to cloud-based computing infrastructures, identifying and troubleshooting technology issues has become increasingly difficult. That is, with users spread across hundreds of server computing devices, IT professionals cannot easily determine when there is an issue and/or where the issue is located. As described above, with existing technology, if a particular business application associated with a cloud-based service provider (e.g., an email application, a teleconference application, etc.) is inoperable or is otherwise causing inefficiencies, an IT professional of a company may not be able to identify the issue and/or a particular server computing device causing the issue. That is, the IT professional may not be able to identify whether the issue is associated with a cloud-based server computing device associated with the company's computing infrastructure, an on-premise server computing device, a cloud-based server computing device associated with the cloud-based service provider, or the like. Further, it may be unclear who is responsible (e.g., the company, the cloud-based service provider, etc.) for managing troubleshooting the issue from end-to-end. As such, the IT professional contacts the cloud-based service provider and waits until the cloud-based service provider can troubleshoot the issue, so that the IT professional can troubleshoot the issue within its own infrastructure. This delay can introduce frustration and can affect productivity. Further, the lack of detection and/or access to remediation can negatively affect computer and/or network performance.

Techniques described herein enable a single service provider to manage—via an end-to-end process—technology issues that arise in a cloud-based computing infrastructure of a company using cloud-based services. As a result, techniques described herein enable proactively identifying issues that can affect performance of cloud-based applications on cloud-based computing infrastructures so that preventative actions can be taken to mitigate the disruption caused by such issues. Furthermore, in some examples, techniques described herein can enable the quick detection of issues that affect performance of cloud-based applications on cloud-based computing infrastructures so that corrective actions can be taken to mitigate the disruption caused by such issues. As described below, techniques described herein can detect such issues using secure processes that, in some examples, provide user anonymity. That is, by leveraging the network-connected monitoring environment described herein, techniques described herein offer improvements to cloud-based computing infrastructures utilizing cloud-based services. As such, techniques described herein offer improvements over existing technology.

FIG. 1 illustrates an example environment 100 for performing techniques described herein. In at least one example, an entity 102, which can be a business, a company, an individual, and/or a group of individuals, can offer services to user(s) 104 associated with the entity 102 via a cloud-based computing infrastructure. As described above, a cloud-based computing infrastructure can avail network services, products, and/or applications (e.g., of the entity 102 and/or third-parties) that are hosted by hundreds—if not thousands—of server computing devices and/or other data centers that can be accessed by users using network connectivity. In at least one example, such a cloud-based computing infrastructure can include one or more server computing devices associated with the entity 102 ("entity server(s) 106"). While not illustrated, in some examples, the cloud-based computing infrastructure can be combined with an on-premise computing infrastructure, such that the entity 102 has both on-premise and cloud-based computing infrastructures for providing services to its user(s) 104.

In at least one example, the entity 102 can be associated with one or more users 104, which can be employees of the entity 102, independent contractors associated with the entity 102, representatives of the entity 102, or otherwise associated with the entity 102. The user(s) 104 can interact with computing devices ("user device(s) 108") via one or more user interfaces. In at least one example, each of the user device(s) 108 can correspond to a mobile phone, a personal digital assistant, a netbook, a laptop computer, a desktop computer, a networked computer, and/or another electronic device that is capable of transmitting or receiving data via network(s) 110.

In at least one example, the network(s) 110 can include the Internet, cable network(s), cellular network(s), cloud network(s), wireless network(s) (e.g., Wi-Fi) and wired network(s), low power area networks (LPWAN), as well as close-range communications such as Bluetooth®, Bluetooth® low energy (BLE), and the like. In some examples, the network(s) 110 can be private networks (e.g., networks wherein restrictions and access rules are established in order to relegate access to select users), public networks (e.g., networks wherein anyone, namely the general public, has access and through it can connect to other networks or the Internet), or combinations of the foregoing.

In addition to the user(s) 104, the entity 102 can be associated with one or more IT users 112, which can comprise an IT team, for handling issues associated with the entity server(s) 106 and/or user device(s) 108 as they arise. In at least one example, such IT user(s) 112 can interact with computing device(s) ("IT computing device(s) 114") to handle issues associated with the entity server(s) 106 and/or user device(s) 108 as they arise.

In at least one example, the entity 102 can offer one or more services via the cloud-based computing infrastructure, for instance, to enable the user(s) 104 to access such service(s) via their user device(s) 108. In at least one example, such service(s) can be availed to enable the user(s) 104 to perform tasks on behalf of the entity 102. In some examples, such service(s) can be availed via cloud-based service provider(s). In at least one example, a cloud-based service provider can be associated with one or more server computing devices ("cloud-based service provider server(s) 116"). Such a cloud-based service provider can avail network services, products, and/or applications that are hosted by the cloud-based service provider server(s) 116. In at least one example, the network services, products, and/or applications can be accessed by the user device(s) 108 using network connectivity. Non-limiting examples of such a cloud-based service provider can include an email service provider, a telecommunication service provider, a document management service provider, a document collaboration service provider, an Internet of Things (IoT) service provider, etc. In at least one example, each of the user device(s) 108 can include instances of applications associated with individual of the services and/or products availed by the cloud-based service provider. As illustrated in FIG. 1, one of the user device(s) 108 includes one or more cloud-based applications 118.

In at least one example, the entity 102 can subscribe, or otherwise access, services of a service provider that provides monitoring and/or remediation services ("monitoring service provider"). In at least one example, such a service provider can be associated with one or more server computing devices ("monitoring service provider server(s) 120"), which can host the monitoring and/or remediation services and make such services available using network connectivity.

In at least one example, the monitoring service provider server(s) 120 can include one or more functional components for performing operations described herein. For example, the monitoring service provider server(s) 120 can include a monitoring module 122, a remediation module 124, a training module 126, and a data store 128. The one or more modules and data structures can be in the form of stand-alone applications, productivity applications, an operating system component, or any other application or software module configured to perform operations as described herein. In at least one example, the monitoring module 122, the remediation module 124, the training module 126, and the data store 128 can represent computer-executable instructions that, when executed by one or more processors, perform operations as recited. Generally, computer-executable instructions include routines, programs, objects, components, data structures, and the like that perform particular functionalities or implement particular data types.

The monitoring module 122 can be configured to monitor the user device(s) 108 based at least in part on data received from the user device(s) 108. In at least one example, the monitoring module 122 can provide a program, having minimal code (e.g., instructions) such as a light weight agent ("agent 130") to individual of the user device(s) 108. For example, when the entity 102 adds one of the user device(s) 108 to their computing infrastructure (e.g., registers the user device with the entity 102), the user device can download, or otherwise access, the agent 130. In some examples, when the user device is registered, the agent 130 can be associated with an identifier of the user device. The agent 130 can additionally be associated with an identifier such that when data is received from the agent 130, the monitoring module 122 can determine which user device and/or agent 130 provided the data.

In at least one example, the agent 130 can run as a background process collecting data associated with the user device (e.g., without input from the corresponding user). In some examples, such data can indicate the health of the user device and/or service(s) being provided by cloud-based service provider(s). Furthermore, in some examples, such data can indicate the health of a system, network, application, etc. associated with the user device. For example, such data can indicate relations between a user's network performance and the user's experience using a particular service of a cloud-based service provider, network signal(s), CPU signal(s), memory signal(s), application indicator(s) that are particular to individual applications (e.g., a loading indicator that appears when an application associated with a service is having network congestion issues and/or an indication of a dropped call provided via another service), etc.

In at least one example, the agent 130 can send such data to the monitoring module 122 in near real-time, at substantially regular intervals, responsive to a detection of an event (e.g., by the user device), etc. In some examples, the agent 130 can send such data to the monitoring module 122 responsive to a request for such data from the monitoring module 122. In at least one example, the agent 130 can refrain from accessing any data that identifies the user associated with the user device. Instead, the agent 130 can be associated with an identifier, which can be associated with an identifier of the user device, such that when the data is received, it is associated with the identifier of the agent 130, and the monitoring module 122 can determine the source of the data (e.g., the agent 130 and/or the user device) based at least in part on the identifier. As such, the data sent to the monitoring module 122 can be collected and sent without accessing any user-authored and/or user-identifiable data. In at least one example, the data can be anonymized and obfuscated such that, if intercepted and/or accessed by an unintended recipient, such an unintended recipient may not be able to identify the user and/or understand the data.

In some examples, anonymized data can be used for identifying trends associated with cloud-based service(s) and/or cloud-based service provider(s) without needing to know identities of individual users. For example, if there are multiple user devices with the agent 130 running in the background in a particular geographic location, the monitoring module 122 can look at location data and common usage of a cloud-based service to determine regional trends without needing to know an identity of an individual user. As another example, anonymized data can be used to geographic trend information with individual entities to indicate network issues (e.g., an entity is using a VPN solution that centrally routes internet access) or other usage trends, which can be used by the monitoring module 122 to determine commonalities of issues with certain configurations, without needing to know an identity of an individual user.

In some examples, entities, such as the entity 102, may want to limit the access of the monitoring service provider with respect to components of their computing infrastructure (e.g., for security reasons or otherwise). In such examples, the monitoring module 122 can access data which can be written to data blocks, as described herein, and can collect data from such data blocks (e.g., via an Application Programming Interface (API)) instead of from the agent 130. In such examples, the monitoring module 122 can access data, which can be indicative of the health of a user device and/or service(s) being provided by cloud-based service provider(s), without the need for the monitoring service provider server(s) 120, or any polling, to access (e.g., "reach in") to a secure infrastructure of the entity 102. Additional details associated with using such data blocks are described below with reference to FIG. 2.

In at least one example, the monitoring module 122 can analyze the inputs (e.g., data received from the agent 130 and/or data blocks) to determine if/when a state of the user device changes. Such a state can be associated with an individual component, operation, application, device, network, system, etc. In some examples, the monitoring module 122 can analyze such inputs using one or more rules, which can be configured to monitor business scenarios and/or application scenarios. In at least one example, a rule can be associated with a condition, the satisfaction of which can indicate an issue (e.g., an opportunity for remedial action to be performed). In at least one example, when the condition is satisfied, the monitoring module 122 can determine that a trigger event has occurred and can send a notification to the remediation module 124. In some examples, the monitoring module 122 can refrain from determining an occurrence of a trigger event until more than a threshold number of conditions are satisfied (e.g., a condition has been satisfied a prescribed number of times in a row, a specified combination of conditions has been satisfied, etc.) and/or a number of user devices associated with state changes meets or exceeds a threshold (e.g., a certain number of user devices associated with executive users have satisfied a condition).

In at least one example, the one or more rules can be configurable. That is, in at least one example, a user associated with the entity 102 and/or a user associated with the monitoring service provider can input one or more rules via a user interface. An example user interface for inputting rules is described below with reference to FIG. 3. In at least one example, rules can be particular to products/services (e.g., availed by cloud-based service provider(s)), entities, users (e.g., characteristics associated therewith), geographic location, time of day, day of the week, date, and the like. In some examples, rules can be determined based at least in part on standards, metrics, or other indicators provided by cloud-based service provider(s). Moreover, in some examples, rules can be determined based at least in part on standards, metrics, or other indicators as determined by monitoring on-premise computing devices and/or associated services associated with an entity.

In some examples, one or more rules can be learned based at least in part on a machine learning mechanism. That is, in some examples, a machine learning mechanism can analyze inputs and associated issues to learn when inputs correspond to such issues. As such, upon receiving new inputs, as described above, a machine-trained data model can identify issues. In some examples, such inputs and associated issues can be codified as rules. In at least one example, the rule(s) (e.g., whether manually input and/or codified based at least in part on machine learning) can be stored in the data store 128.

Non-limiting examples of rules include: (a) if all locations of an entity 102 are failing for an application login, send an email to IT user(s) 112; (b) if all locations of an entity 102 are failing for an application login and the cloud-based service provider has acknowledged the issue, generate a support ticket; (c) if a particular building is offline on a weekend, notify a particular IT user; (d) if a particular building is offline on a weekend, notify IT user(s) 112; (e) if a CEO has mail stuck in an email outbox, call a particular IT user; (f) if a number of executive-level users have mail stuck in an email outbox, first attempt to reboot the system(s) and then, call a particular IT user; and so on. The above rules are provided for illustration only and should not be construed as limiting. As described above, rules can be configurable and based on products/services (e.g., availed by cloud-based service provider(s)), entities, users (e.g., characteristics associated therewith), geographic location, time of day, day of the week, date, and the like. In at least one example, each rule can indicate one or more outputs for providing a notification that a rule has been satisfied.

The remediation module 124 can receive notifications from the monitoring module 122 and can initiate and/or perform, when applicable, one or more actions to remediate issues identified by the monitoring module 122. In some examples, individual rules can be associated with indications of actions to be performed. For example, a rule can indicate that if a condition associated with the rule is satisfied, that an email is to be sent to a designated user. Other outputs can include phone calls, text messages, in-application notifications, support tickets, entity tools (e.g., incident management tools of the entity and/or available via a third-party), dashboards, and the like. In some examples, as described above, rules can be particular to users (e.g., based on characteristic(s) associated therewith). As such, in some examples, different users can be associated with different outputs. In such examples, the remediation module 124 can use an identifier of the user (e.g., which can be based at least in part on an identifier of the agent 130 and/or an identifier associated with a corresponding user device) to determine which output is appropriate for the user affected.

As described above, in at least one example, individual rules can designate an output. In such an example, the remediation module 124 can determine a prescribed output, generate the output, and send the output to a user designated in the rule (e.g., a computing device associated therewith). In at least one example, the output can be presented to the designated user via a computing device associated therewith. In some examples, the designated user can determine that no remedial action is necessary. In other examples, the designated user can perform one or more actions to prevent or correct the identified issue. In such examples, the remediation module 124 can be said to have initiated the performance of such action(s) (e.g., by sending the output to the designated user).

In some examples, the remediation module 124 can perform one or more actions to prevent or correct the identified issue without involving another user. That is, the remediation module 124 can automatically perform one or more actions to prevent or correct the identified issue. For example, the remediation module 124 can cause an identified device to reboot, to perform a scan for viruses or software versions, etc. In additional or alternative examples, the remediation module 124 can make one or more modifications to remedy an issue. In some examples, the one or more actions can be prescribed by the rule. In some examples, the one or more actions can be learned via a machine learning mechanism, as described herein.

In at least one example, the remediation module 124 can cause dashboards (e.g., an information management tool that visually tracks, analyzes, and displays performance indicators and/or other metrics) and/or other user interfaces to be presented so that a user associated with the entity 102 and/or a user associated with the monitoring service provider can monitor the user device(s) 108 in near real-time. In some examples, such dashboards can compare the performance of individual of the user device(s) 108 to one another and/or to user device(s) associated with other entities. In some examples, such dashboards can compare the performance of different entities. A non-limiting example of a user interface that can be used by a user associated with the entity 102 (e.g., IT user(s) 112) and/or a user associated with the monitoring service provider for monitoring the user device(s) 108 in near real-time is described below with reference to FIG. 4.

The training module 126 can be configured to train one or more data models, for example, using machine learning mechanisms as described herein. In at least one example, the training module 126 can train a data model via machine learning mechanism(s) to determine which input(s) are indicative of individual issue(s) that can affect user experience. In at least one example, the training module 126 may utilize a machine learning mechanism to build, modify, or otherwise utilize data model(s) that are created from example inputs and makes predictions or decisions. In such an example, the data model(s) may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the example inputs can include data (e.g., health, etc.) previously received from user devices and issues identified based on such data. Based at least in part on the inputs, the training module 126 can build, modify, or otherwise utilize data model(s) to identify issues based on received inputs.

Furthermore, in some examples, the training module 126 can build, modify, or otherwise utilize data model(s) to determine action(s) to be performed for preventing and/or correcting identified issues. In such examples, the example inputs can include previously identified issues and remedial actions performed to remediate such identified issues. As a result, the training module 126 can train data model(s) to determine action(s) to be performed for preventing and/or correcting identified issues.

In at least one example, such machine-trained data model(s) can be stored in the data store 128 and updated overtime.

The data store 128 can store data as described herein. In some examples, the data store 128 can store rules, which can be provided by entities, the monitoring service provider, etc. In some examples, the data store 128 can store machine-trained data model(s) trained by the training module 126. Furthermore, in some examples, the data store 128 can store data associated with entities that subscribe, or have subscribed, to services of the monitoring service provider.

Figure 2:
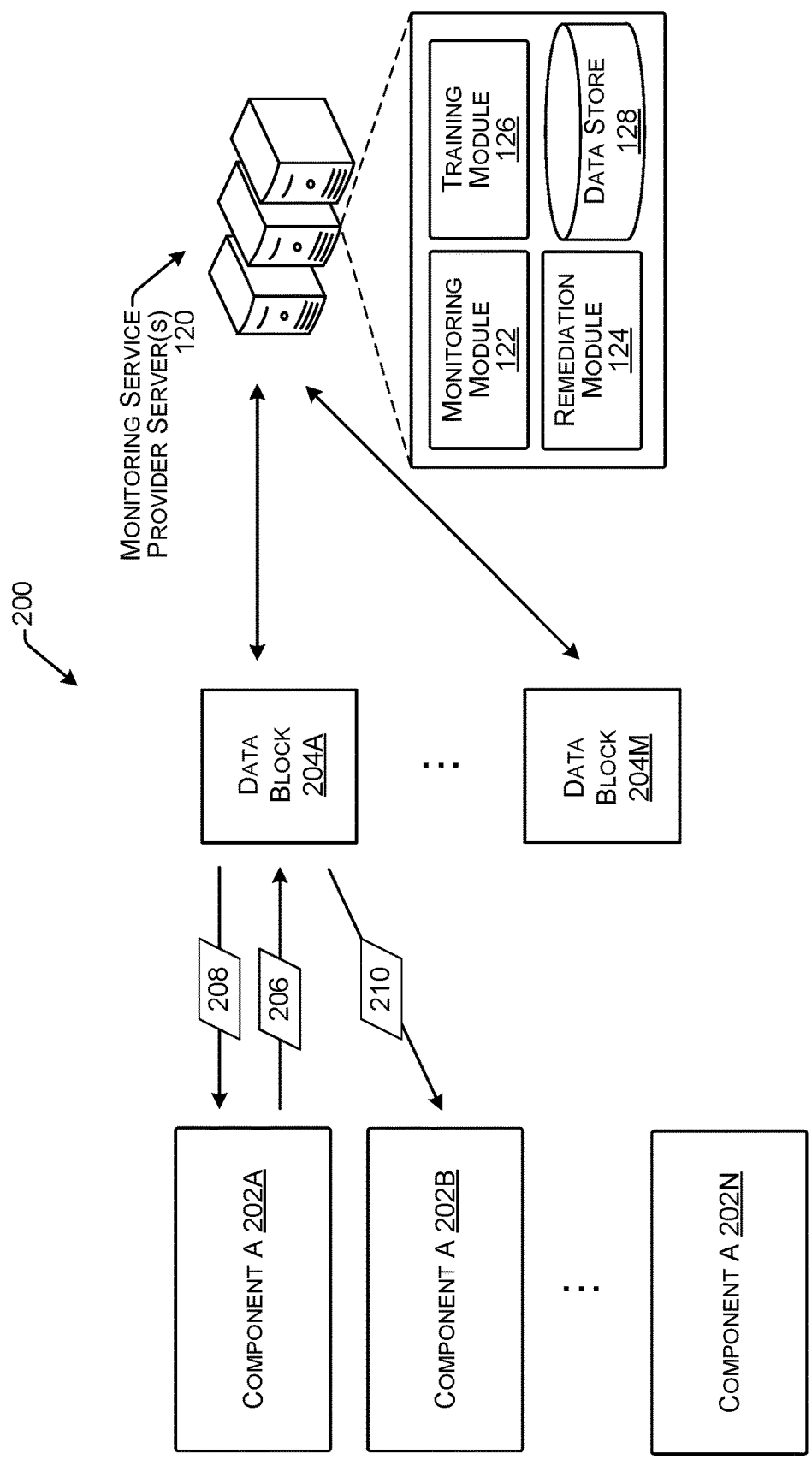
FIG. 2 illustrates an example environment for accessing data from a secure computing infrastructure using data blocks, as described herein.

FIG. 2 illustrates an example environment 200 for accessing data from a secure computing infrastructure using data blocks. As described above, in some examples, entities, such as the entity 102, may want to limit the access of the monitoring service provider with respect to components of their computing infrastructure. In such examples, the monitoring module 122 can access data which can be written to data blocks, as described herein, and can collect data from such data blocks (e.g., via an API) instead of from the agent 130.

As illustrated in FIG. 2, an entity 102 can be associated with one or more components 202 (individually, 202A-202N). Such components 202 can be computing devices (e.g., the user device(s) 108), processes running thereon, or other components associated with a computing infrastructure of the entity 102. As a non-limiting example, a component 202A can be a locally deployed agent or cloud resource that can be deployed in a subscription of a user and/or a device deployed on a local network of an entity that servers as a watcher node. In at least one example, the components 202 can communicate with one another via the network(s) 110 (not pictured in FIG. 2). Furthermore, the components 202 can be remotely located from the monitoring service provider server(s) 120 and thus can communicate with the monitoring service provider server(s) 120 via the network(s) 110.

In at least one example, the monitoring service provider can avail one or more data blocks 204 (individually, 204A-204M), which can be written to and/or read from the components 202. Each data block 204A-204M can be a light weight container (e.g., data repository) that is associated with a unique identifier (e.g., a globally unique identifier). In some examples, individual data blocks 204 can be designated to store particular types of data. In at least one example, each data block 204A-204M can be written to, for example, by the components 202 and/or can be read by, for example, the components 202. In at least one example, for a component 202A to write to a data block 204A, the component 202A can send data 206 to the data block 204A. In at least one example, such data 206 can be sent responsive to the monitoring module 122 requesting such data (e.g., by sending instruction(s) 208 to the component 202A that include an identifier associated with the data block 204A). In additional or alternative examples, such data 206 can be sent in near real-time, at substantially regular intervals (e.g., after lapse of a period of time), responsive to an event (e.g., detected by the component 202A), etc.

In at least one example, the data 206 can include data associated with the health of the component 202A and/or product(s)/service(s) associated with a cloud-based service provider, as described above. In some examples, the data 206 can include an identifier (as provided by the instruction(s) 208) so that the data 206 is written to the correct data block 204A. In at least one example, the data 206 may be obscure such that it may not be useful unless the meaning of the data 206 is known. However, component(s) that know the meaning of the data 206 (e.g., other system(s) associated with the environment 100) may be able to use the data 206 in ways that are meaningful to the component(s). That is, the data 206 itself may include a value or other indication that is meaningless to anyone who may intercept the data 206 as it is transmitted to the data block 204A and/or stored by the data block 204A. This provides an added layer of security for enabling secure communications.

The data block 204A can store the data 206 and/or can send the data 206 to the monitoring service provider server(s) 120 via an API. That is, the component 202A can write to the data block 204A and such data can be accessible by the monitoring service provider server(s) 120. By using the data blocks 204, the monitoring service provider server(s) 120 can access data from the components 202 without otherwise accessing the components 202 and/or other data associated therewith. That is, the data blocks 204 can be intermediary data repositories that allow the monitoring module 120 (or other module(s) associated with the monitoring service provider server(s) 120) to access data from the components 202 but without granting the monitoring service provider full access to the components 202. In some examples, the monitoring service provider server(s) 120 can track changes to data received by the components 202 such that each time a value is changed, its history is tracked. Such tracking can be useful for trend analysis, which can be performed by the monitoring module 122.

In some examples, the components 202 can transmit data via network connections, as described above. In examples where a network connection is not available (e.g., a network is down, the monitoring service provider server(s) 120 are offline, etc.), the components 202 can refrain from transmitting data unless and until a network connection is restored. That is, the components 202 can store data intended for the data blocks 204 until the network connection is restored and can send the data to the data blocks 204 after the network connection is restored. In some examples, the ability to store data locally until the network connection is restored can alleviate requirements for consistent access to the network(s) 110. That is, the components 202 can provide data to the data blocks 204 when there is connectivity.

In some examples, data associated with the data blocks 204 can be read by the components 202. For instance, in at least one example, the component 202B can access data 210 stored by the data block 204A. In some examples, such data 210 can be provided by another component (e.g., the component 202A and/or the component 202N). In some examples, such data 210 can be provided by the monitoring service provider server(s) 120.

In at least one example, the ability of components 202 to read from or write to data blocks 204 can be controlled by one or more layers of security. For instance, in at least one example, prior to allowing the components 202 to read from and/or write to the data blocks 204, the data blocks 204 can determine whether the components 202 satisfy a security condition. In some examples, such a security condition can be associated with an IP address, a security key, or the like. For instance, a component may not be able to write to a data block unless the data to be written to the data block is associated with a particular IP address and/or is associated with a particular security key. Similarly, a component may not be able to read from a data block unless the data to be read from the data block is associated with a particular IP address and/or is associated with a particular security key.

In at least one example, the monitoring module 122 can access data from the data blocks 204, which can be indicative of the health of a user device and/or service(s) being provided by cloud-based service provider(s), without the need for the monitoring service provider server(s) 120, or any polling, to access (e.g., "reach in") to a secure computing infrastructure of the entity 102. The monitoring module 122 can utilize such data as described above to determine when a state of a component 202A-202N changes such to notify a designated user. That is, the monitoring module 122, remediation module 124, etc. can perform the same or similar functions as described above with reference to FIG. 1, however the inputs received by the monitoring module 122 can be provided by the data blocks 204 instead of agent(s) associated with the user device(s) 108.

In addition to being useful for the monitoring module 122, data stored in the data blocks 204 can be accessible to and/or useful for other modules and/or components of the monitoring service provider server(s) 120 and/or other system(s) associated with the environment 100.

Figure 3:
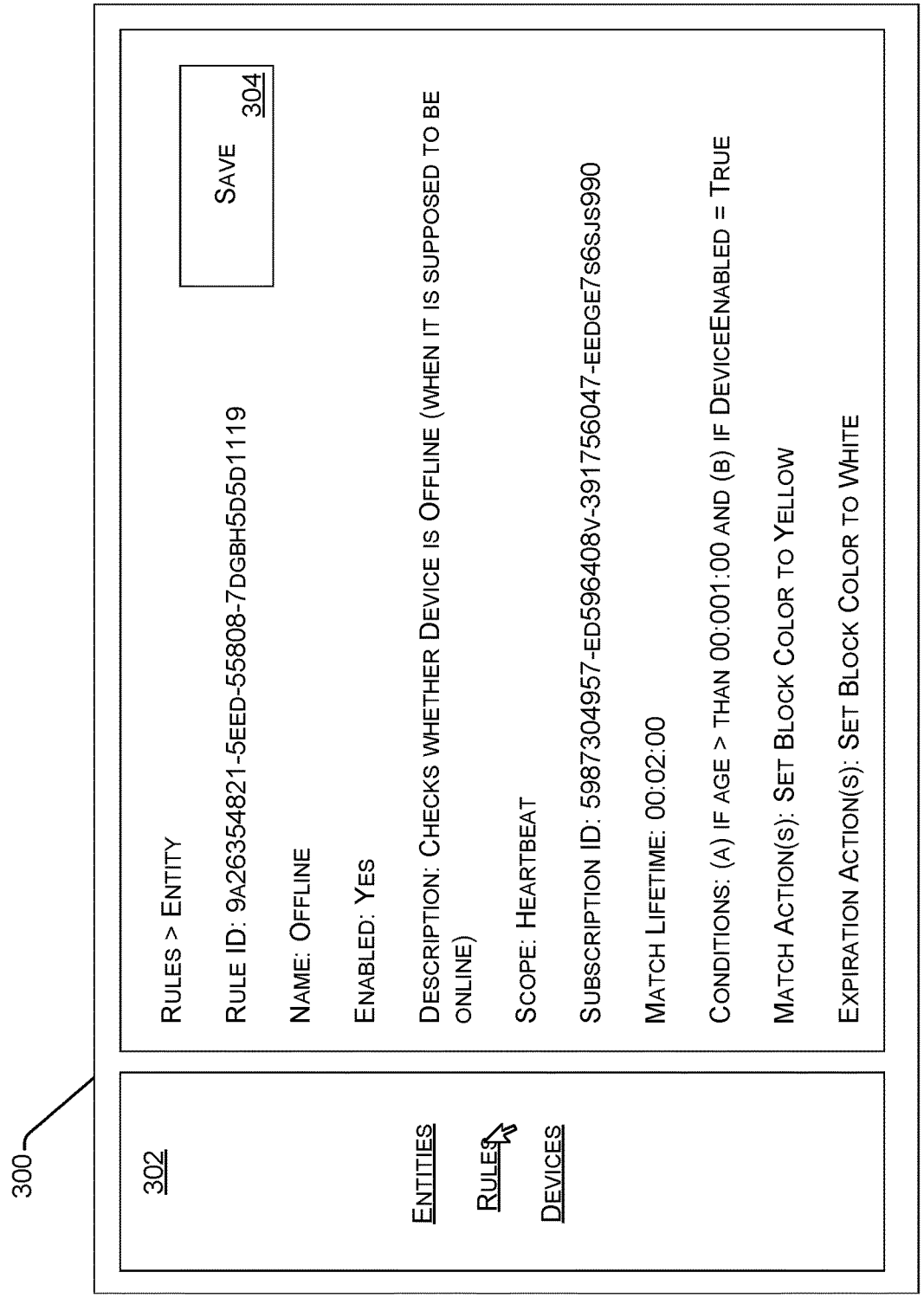
FIG. 3 illustrates an example user interface via which a rule can be provided to a monitoring service provider, as described herein.

FIG. 3 illustrates an example user interface 300 via which a rule can be provided to the monitoring service provider. As described above, in at least one example, the monitoring module 122 can analyze inputs (e.g., data received from the agent 130 and/or data blocks 204) to determine if/when a state of a user device changes. In some examples, the monitoring module 122 can analyze such inputs using one or more rules. As described above, in at least one example, the one or more rules can be configurable for monitoring business scenarios and/or application scenarios. In at least one example, a user associated with the entity 102 and/or a user associated with the monitoring service can input one or more rules via a user interface, such as the user interface 300 illustrated in FIG. 3.

In at least one example, the user interface 300 can include a menu 302 or toolbar that includes one or more options for viewing data available via the monitoring service provider. As a non-limiting example, the menu 302 can present three options: entities, rules, and devices. In at least one example, each option can be associated with an actuation mechanism that, when actuated, can enable a user to view data associated with entities, rules, and devices, respectively. As illustrated in FIG. 3, a user actuates the actuation mechanism corresponding to the rules option. As such, the user interface 300 can prompt the user to input data associated with a rule via the user interface 300.

As a non-limiting example, the user interface 300 can prompt the user to provide a name for the rule, an indication of whether the rule is enabled, a description for the rule, the scope of data required for applying a rule, a period of time after which the rule should be reconsidered, one or more conditions associated with the rule, and one or more actions to be performed if the condition(s) are determined to be satisfied. In some examples, the monitoring service provider can associate a rule identifier and/or a subscription identifier with the rule. As illustrated in FIG. 3, this particular rule is associated with two conditions that, if satisfied, cause the remediation module 124 to cause the color of a block representing a particular device to change from white to yellow. That is, if a particular device has not provided updated data in more than one minute such that the "age" of the data is greater than 00:01:00 and the device is enabled (e.g., is supposed to be online), the monitoring module 122 can determine the occurrence of a trigger event and can prompt the remediation module 124 to take one or more actions (e.g., cause the color of a block representing a particular device to change from white to yellow). In at least one example, the user interface 300 can be associated with an actuation mechanism 304, the actuation of which can cause the rule to be stored in the data store 128. In at least one example, if the rule is particular to an entity (and corresponding subscription), the rule can be mapped to, or otherwise associated with, a profile of the entity stored in the data store 128. In some examples, however, a rule can be a global rule and, in such examples, can be applicable to all subscriptions.

The rule illustrated in FIG. 3 is but one rule and additional or alternative rules, which can monitor user experience from at least one of a business perspective and/or an application perspective, can be added to the data store 128 via a user interface similar to the user interface 300 illustrated in FIG. 3. The user interface 300 is but one example of a user interface and additional or alternative data can be presented by a user interface in an additional or alternative configuration. That is, the user interface 300 should not be construed as limiting.

Figure 4:
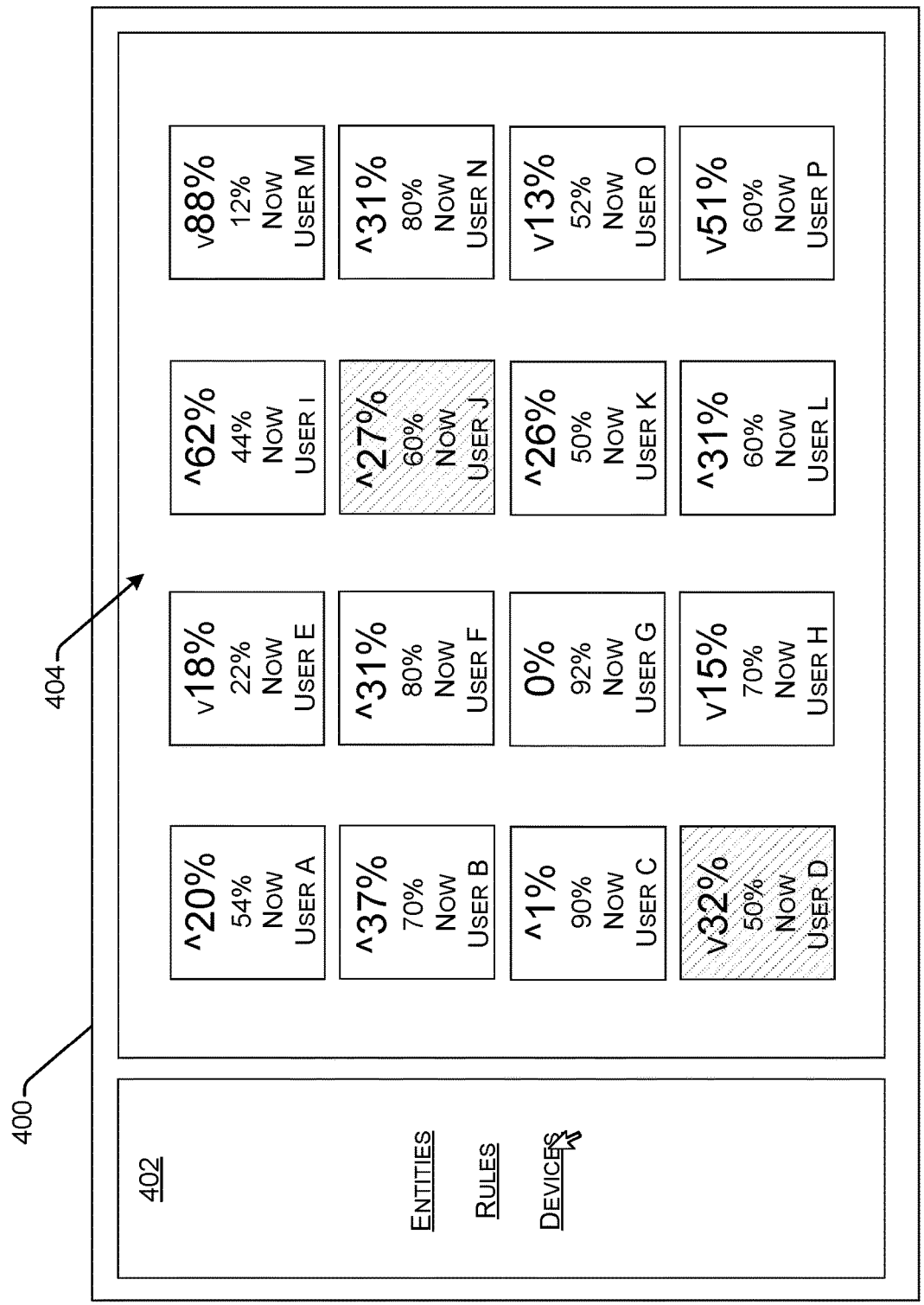
FIG. 4 illustrates an example user interface for monitoring states of user devices, as described herein.

FIG. 4 illustrates an example user interface 400 for monitoring states of user devices, as described herein. Much like the user interface 300 described above with reference to FIG. 3, the user interface 400 can include a menu 402 or toolbar that includes one or more options for viewing data available via the monitoring service provider. As a non-limiting example, the menu 402 can present three options: entities, rules, and devices. In at least one example, each option can be associated with an actuation mechanism that, when actuated, can enable a user to view data associated with entities, rules, and devices, respectively. As illustrated in FIG. 4, a user actuates the actuation mechanism corresponding to the devices option. As such, the user interface 400 can present a view of a plurality of devices 404. In FIG. 4, the plurality of devices 404 are illustrated in a small thumbnail view, wherein each device is represented by a graphical element. However, in additional or alternative examples, the plurality of devices 404 can be presented in a list view, a large thumbnail view, or any other view where each device is represented by a text element or graphical element.

In at least one example, each of the graphical elements can correspond to a user device, such as one of the user device(s) 108 described above with reference to FIG. 1. That is, each of the graphical elements represented can correspond to a user device associated with an entity, such as the entity 102. In at least one example, each of the user devices (e.g., via the use of agents and/or data blocks, as described above) can send data to the monitoring module 122, as described above with reference to FIG. 1. In some examples, at least some of the data received by the monitoring module 122 can be presented via the user interface 400. For example, in at least one example, each graphical element can include text elements and/or graphical elements that depict a state of a respective user device. In at least one example, the graphical elements can be interactable and/or otherwise associated with an actuation mechanism such that a user can interact with a graphical element to cause additional data associated with the corresponding user device to be presented. In some examples, if the state of a user device satisfies a condition that prompts the graphical element to change colors, the corresponding graphical element can be presented as a different color and/or otherwise visually different from the other graphical elements (e.g., in FIG. 4, such a color change is shown as crosshatching). In at least one example, the remediation module 124 can effectuate the color change and/or change to the presentation of the graphical element.

In at least one example, a user, such as an IT user 112 and/or a user (e.g., representative) associated with the monitoring service provider can use the user interface 400 to determine which user devices require remedial action to be taken. As such the user can perform one or more actions, or notify another user to perform one or more actions, in an effort to prevent or correct a respective user from having a negative user experience.

The user interface 400 is but one example of a user interface and additional or alternative data can be presented by a user interface in an additional or alternative configuration. That is, the user interface 400 should not be construed as limiting.

As described above, in addition to presenting data associated with user devices via a user interface, the remediation module 124 can notify a user of a change to a state of a user device via one or more additional or alternative mechanisms. For example, the remediation module 124 can send a text message to a computing device associated with a designated user to alert the designated user of the change to the state of the user device. Furthermore, in some examples, the remediation module 124 can send an email, initiate a phone call, or otherwise send a communication to a computing device associated with a designated user. In at least one example, the remediation module 124 can generate a support ticket that can be used to notify a designated user of a changed state of the user device. In at least one example, as described above, the remediation module 124 can access an applicable rule to determine a prescribed output for communicating the changed state of the user device.

While changes to states of user devices are described above, it should be noted that such states can be associated with components of user devices themselves and/or systems, applications, products, services, networks, etc. with which the one or more user devices are associated.

FIGS. 5-9 describe example processes for facilitating techniques described herein. The example processes are described in the context of the system of FIGS. 1 and 2 but are not limited to those environments. Furthermore, FIGS. 1 and 2 are not limited to performing techniques as described herein.

The processes described below in association with FIGS. 5-9 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations and/or processes can be combined in any order and/or in parallel to implement the processes.

Figure 5:
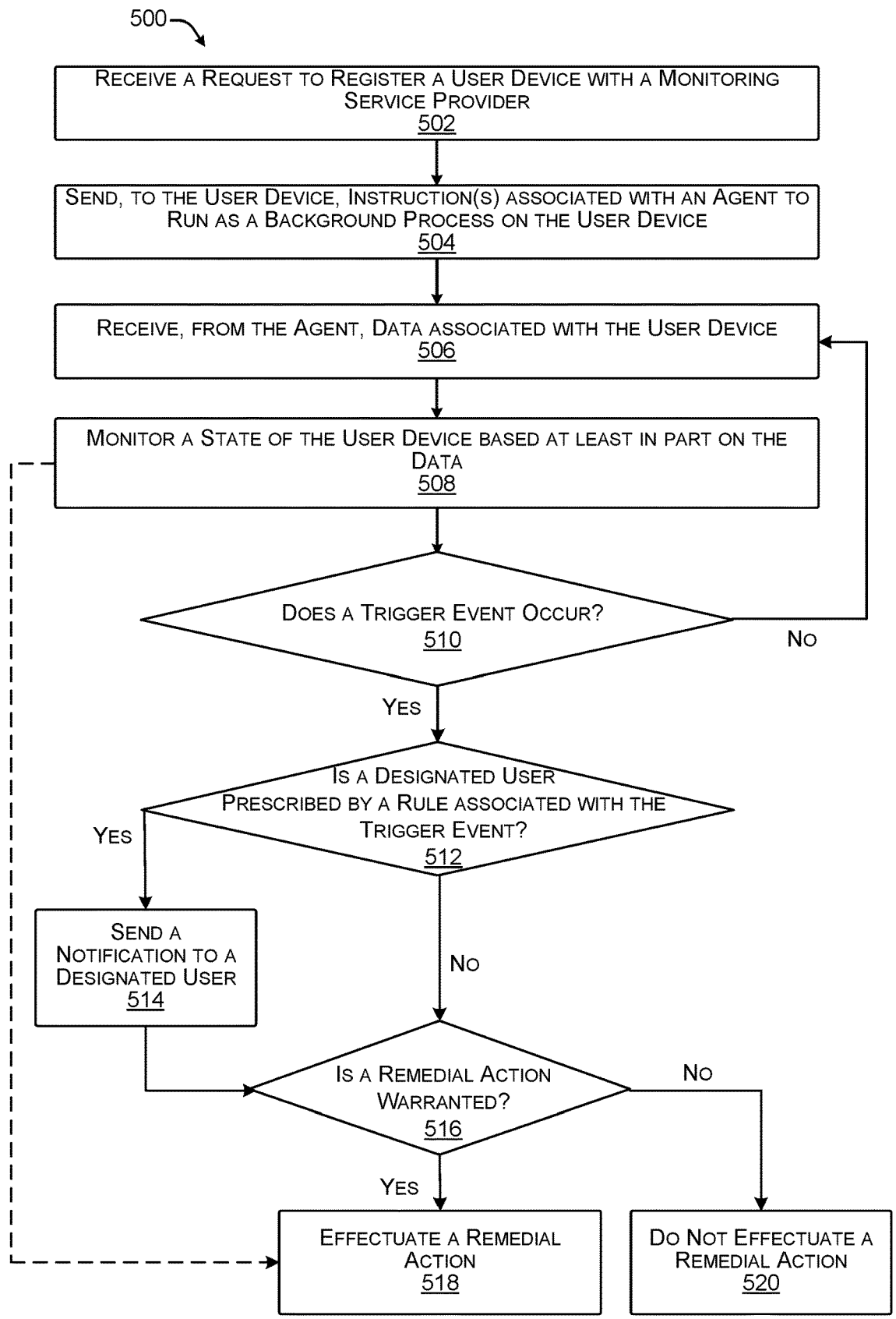
FIG. 5 illustrates an example process for monitoring a state of a user device and/or effectuating a remedial action, as described herein.

FIG. 5 illustrates an example process 500 for monitoring a state of a user device and/or effectuating a remedial action, as described herein.

At operation 502, the monitoring module 122 receives a request to register a user device with a monitoring service provider. In at least one example, a user device (e.g., of the user device(s) 108) can send a request to the monitoring service provider server(s) 120 to register the user device with a subscription associated with an entity 102 with which the user device is associated. In some examples, a user (e.g., of the user(s) 104) of the user device can provide an input to the user device to initiate the request. In other examples, an IT user (e.g., of the IT user(s) 112) can provide an input to the user device to initiate the request. In at least one example, the monitoring module 122 can receive the request and can add the user device to a portal associated with the monitoring service provider.

At operation 504, the monitoring module 122 sends, to the user device, instruction(s) associated with an agent to run as a background process on the user device. In at least one example, the monitoring module 122 can provide a program, having minimal code (e.g., instructions), such as a light weight agent ("agent 130"), to individual of the user device(s) 108. In at least one example, the agent 130 can run as a background process collecting data associated with the user device (e.g., without input from the corresponding user). In some examples, such data can indicate the health of the user device and/or service(s) being provided by cloud-based service provider(s). That is, such data can be indicative of the health of a system, application, network, etc. with which the user device is associated.

At operation 506, the monitoring module 122 receives, from the agent 130, data associated with the user device. In at least one example, the agent 130 can send such data to the monitoring module 122 in near real-time, at substantially regular intervals, responsive to a detection of an event (e.g., by the user device), etc. In some examples, the agent 130 can send such data to the monitoring module 122 responsive to a request for such data from the monitoring module 122. In at least one example, the agent 130 can refrain from accessing any data that identifies the user associated with the user device. As such, the data sent to the monitoring module 122 can be collected and sent without accessing any user-authored and/or user-identifiable data.

At operation 508, the monitoring module 122 monitors a state of the user device based at least in part on the data. In at least one example, the monitoring module 122 can analyze inputs (e.g., data received from the agent 130) to determine if/when a state of the user device changes. In some examples, the monitoring module 122 can analyze such inputs using one or more rules, which can be configured to monitor business scenarios and/or application scenarios.

In at least one example, the one or more rules can be configurable. That is, in at least one example, a user associated with the entity 102 and/or a user associated with the monitoring service can input one or more rules via a user interface. In at least one example, rules can be particular to products/services (e.g., availed by cloud-based service provider(s)), entities, users (e.g., characteristics associated therewith), geographic location, time of day, day of the week, date, and the like. In some examples, one or more rules can be learned based at least in part on a machine learning mechanism, as described above. In some examples, such inputs and associated issues can be codified as rules. In at least one example, the rule(s) can be stored in the data store 128.

At operation 510, the monitoring module 122 determines whether a trigger event occurs. In at least one example, a trigger event can be an event that prompts the monitoring module 122 to send a notification to the remediation module 124 regarding a state of the user device. In some examples, a trigger event can be associated with any change to a state of a user device. In some examples, if a state of a user device changes by more than a threshold, the monitoring module 122 can determine an occurrence of a trigger event.

In at least one example, a rule can be associated with a condition, which can indicate an issue (e.g., business and/or application). In at least one example, the monitoring module 122 can analyze the inputs to determine whether the condition is satisfied. In such an example, if/when the condition is satisfied, the monitoring module 122 can determine that a trigger event has occurred. In some examples, a trigger event may be associated with multiple rules, which can be associated with multiple conditions. In some examples, the monitoring module 122 may not determine an occurrence of a trigger event until more than a threshold number of conditions are satisfied. For example, in some examples, the monitoring module 122 can refrain from determining an occurrence of a trigger event until a condition has been satisfied a prescribed number of times in a row, a specified combination of conditions has been satisfied, etc. That is, in at least one example, the monitoring module 122 can determine the occurrence of a trigger event based at least in part on determining that more than a threshold number of conditions are satisfied.

In some examples, a rule can be associated with a value and the monitoring module 122 can determine an occurrence of a trigger event based at least in part on a relationship between a value received as an input (e.g., from the agent 130) and a threshold value associated with the rule. That is, in at least one example, the monitoring module 122 can determine that a value received from the agent 130 satisfies a threshold and can therefore determine an occurrence of a trigger event.

At operation 512, the remediation module 124 can determine whether a designated user is prescribed by a rule associated with the trigger event. In at least one example, the monitoring module 122 can determine that a trigger event has occurred. In at least one example, the trigger event can correspond to a rule that indicates an output and/or a remedial action. In at least one example, an output can be associated with a designated user to whom the output should be sent. In such an example, the remediation module 124 can determine, based at least in part on the rule that corresponds to the trigger event, a prescribed output, generate the output, and send the output to a user designated in the rule. If a designated user is prescribed by the rule associated with the trigger event, the remediation module 124 can send a notification to the designated user, as illustrated at operation 514. That is, if a designated user is prescribed by the rule associated with the trigger event, the remediation module 124 can generate and send a text message, email, phone call, etc. to a computing device operable by the designated user.

At operation 516, it can be determined whether a remedial action is warranted. In some examples, if a remedial action is warranted by the designated user, the designated user can perform the remedial action. That is, the designated user can effectuate the remedial action, as illustrated in operation 518. In some examples, no user is designated and/or the rule is associated with an indication that the remedial module 124 is to address the trigger event automatically (e.g., without involving another user). In such examples, the remediation module 124 can determine whether a remedial action is warranted, as illustrated in operation 516. In such examples, if a remedial action is warranted, the remediation module 124 can effectuate the remedial action prescribed by the rule, as illustrated at operation 518.

At operation 520, it can be determined that no remedial action is warranted. That is, in some examples, a notification can be sent to the remediation module 124 and the remediation module 124 can send a notification to a designated user. The designated user can determine that no remedial actions are warranted and can refrain from performing an action. In some examples, the designated user can interact with a user device to indicate to the remediation module 124 that no remedial action is warranted. In examples where the remediation module 124 is to automatically address the trigger event, the remediation module 124 can determine whether a remedial action is warranted and, if no remedial action is warranted, can refrain from effectuating a remedial action.

In some examples, if the monitoring module 122 determines that a trigger event does not occur, process 500 can return to operation 506, where additional data can be received from the user device and the monitoring module 122 can continue to monitor the state of the user device.

In at least one example, the monitoring module 122 can utilize machine-trained data model(s) to monitor the state of the user device. In such an example, the machine-trained data model(s) can identify issue(s) based at least in part on the data received from the agent 130 and/or recommend remedial action(s) to be taken. As such, in at least one example, process 500 can proceed from operation 508 to operation 518 (e.g., as illustrated by the dashed line from operation 508 to operation 518) and the remediation module 124 can effectuate the recommended remedial action(s) to be taken.

Figure 6:
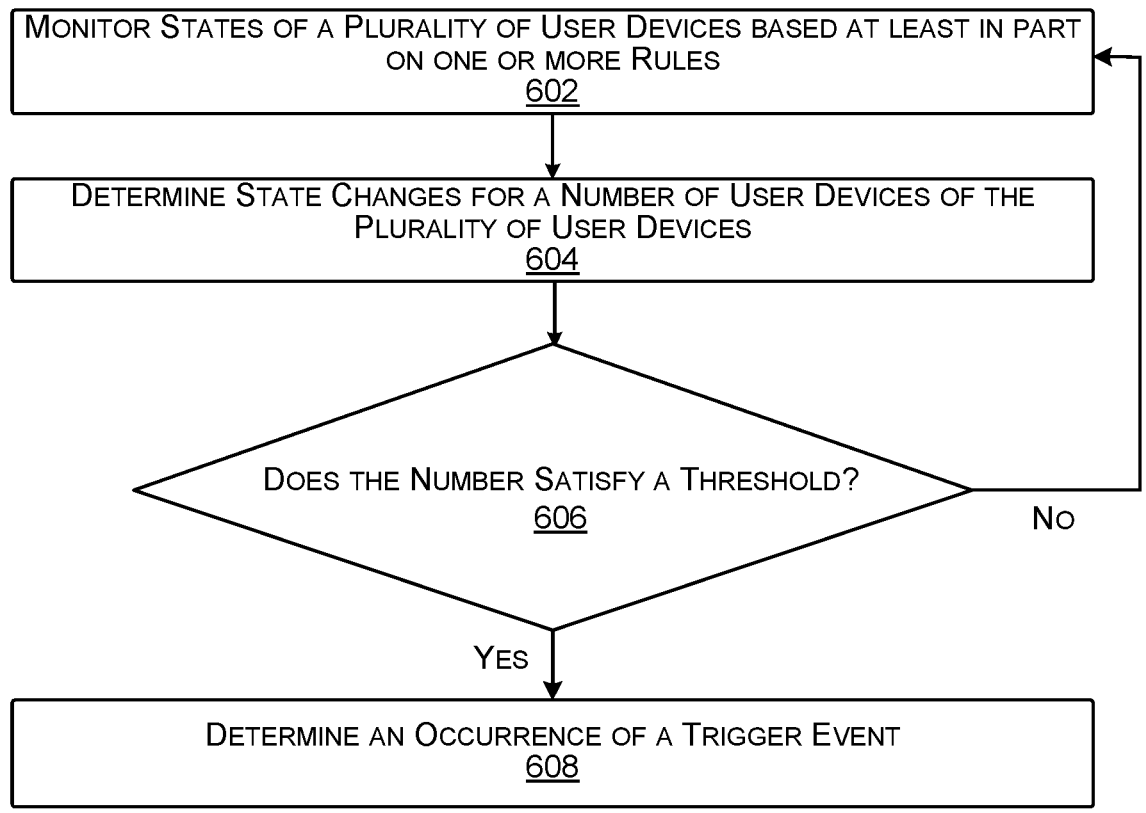
FIG. 6 illustrates an example process for effectuating a remedial action based at least in part on a number of devices being associated with state changes, as described herein.

FIG. 6 illustrates an example process 600 for effectuating a remedial action based at least in part on a number of devices being associated with state changes, as described herein.

At operation 602, the monitoring module 122 can monitor states of a plurality of user devices 108 based at least in part on one or more rules, as described above with reference to operation 508 of FIG. 5.

At operation 604, the monitoring module 122 can determine state changes for a number of user devices of the plurality of user devices 108. That is, based at least in part on monitoring states of the plurality of user devices 108, the monitoring module 122 can determine that some number of the plurality of user devices 108 are associated with state changes.

At operation 606, the monitoring module 122 can determine whether the number satisfies a threshold. In at least one example, the monitoring module 122 can determine whether the number of user devices 108 associated with state changes satisfies a threshold. In at least one example, the threshold can be configurable such that the monitoring service provider and/or the entity 102 can indicate a number of user devices associated with state changes that prompts the monitoring service to determine an occurrence of a trigger event, as illustrated at operation 608 and described above with reference to operation 510 of FIG. 5. For example, if a single device is offline (when it is supposed to be online), the monitoring module 122 can refrain from taking any action. However, if more than a threshold number of devices are offline (when they are supposed to be online), the monitoring module 122 can notify the remediation module 124 so that the remediation module 124 can alert a designated user. In some examples, however, if the single device is associated with an executive or another user associated with a particular level of status or privilege, the threshold may be one and thus the single device being offline can satisfy the threshold. In some examples, the threshold can be associated with a rule, as described above.

Figure 7:
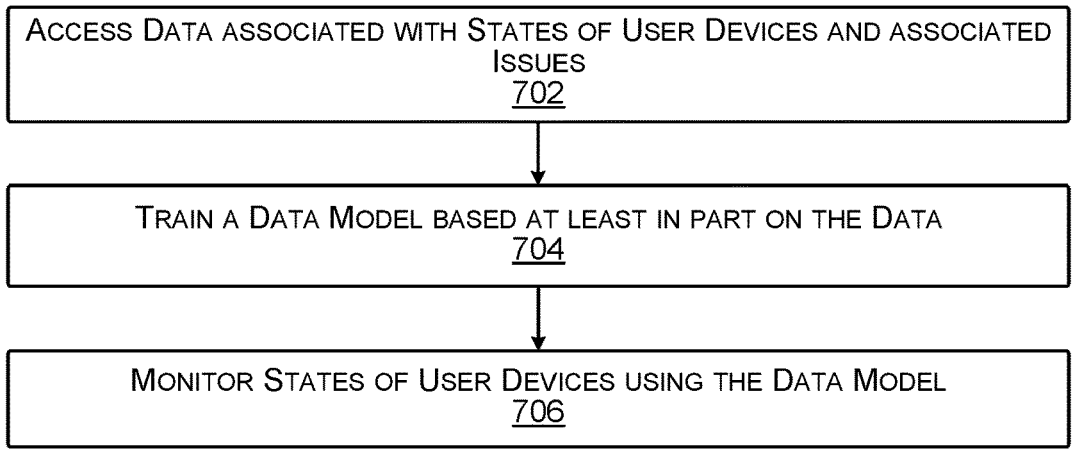
FIG. 7 illustrates an example process for training a data model using machine learning techniques, as described herein.

FIG. 7 illustrates an example process 700 for training a data model using machine learning techniques, as described herein.

At operation 702, the training module 126 can access data associated with states of user devices and associated issues. In at least one example, the data store 128 can store data associated with previously received inputs (e.g., data received from agents and/or data blocks) and issues identified based on such inputs. In at least one example, the training module 126 can access such data for training, as described below.

At operation 704, the training module 126 can train a data model based at least in part on the data. As described above, the training module 126 can be configured to train one or more data models, for example, using machine learning mechanisms as described herein. In at least one example, the training module 126 can train a data model via machine learning mechanism(s) to determine which input(s) are indicative of individual issue(s) that can affect user experience. In at least one example, the training module 126 may utilize a machine learning mechanism to build, modify, or otherwise utilize data model(s) that are created from example inputs and makes predictions or decisions. In at least one example, the example inputs can include data (e.g., health, etc.) previously received from user devices and issues identified based on such data. Based at least in part on the inputs, the training module 126 can build, modify, or otherwise utilize data model(s) to identify issues based on received inputs. Resulting machine-trained data models can be stored in the data store 128 for subsequent use by the monitoring module 122.

At operation 706, the monitoring module 122 can monitor states of user devices using the data model. As described above, in at least one example, the monitoring module 122 can analyze the inputs (e.g., data received from the agent 130 and/or data blocks) to determine if/when states of user devices change. In some examples, the monitoring module 122 can analyze such inputs, which can be configured to monitor business scenarios and/or application scenarios. In at least one example, the machine-trained data model can be used to monitor the business scenarios and/or application scenarios, and in at least one example, upon receiving new inputs, as described above, the machine-trained data model can identify issues. In some examples, such inputs and associated issues can be codified as rules.

Figure 8:
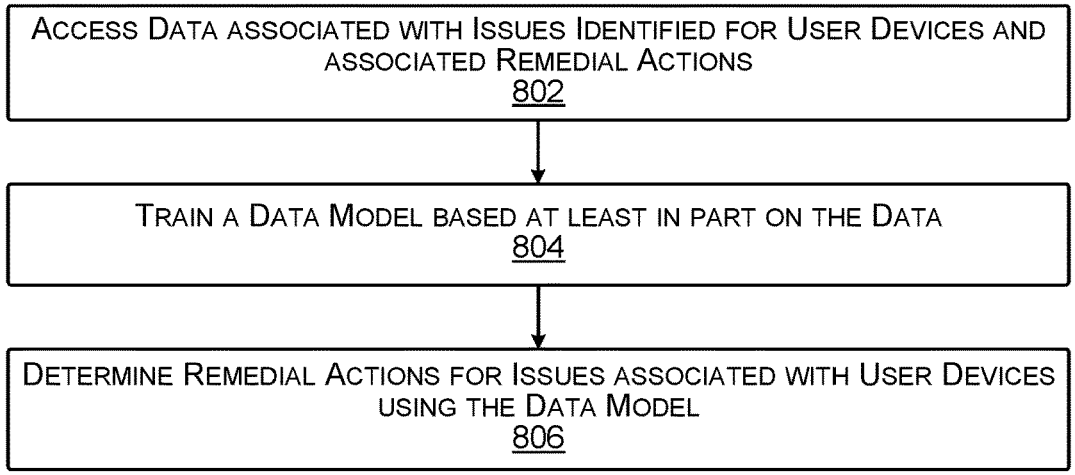
FIG. 8 illustrates an example process for training a data model using machine learning techniques, as described herein.

FIG. 8 illustrates an example process 800 for training a data model using machine learning techniques, as described herein.

At operation 802, the training module 126 can access data associated with issues identified for user devices and associated remedial actions. In at least one example, the data store 128 can store data associated with previously identified issues (e.g., based on data received from agents and/or data blocks) and remedial actions taken to prevent and/or correct such identified issues. In at least one example, the training module 126 can access such data for training, as described below.

At operation 804, the training module 126 can train a data model based at least in part on the data. As described above, the training module 126 can be configured to train one or more data models, for example, using machine learning mechanisms as described herein. In at least one example, the training module 126 can train a data model via machine learning mechanism(s) to determine which input(s) are indicative of individual issue(s) that can affect user experience. In at least one example, the training module 126 may utilize a machine learning mechanism to build, modify, or otherwise utilize data model(s) that are created from example inputs and makes predictions or decisions. In at least one example, the example inputs can include issues previously identified for user devices and remedial actions taken based on such issues. Based at least in part on the inputs, the training module 126 can build, modify, or otherwise utilize data model(s) to determine action(s) to be performed for preventing and/or correcting identified issues. Resulting machine-trained data models can be stored in the data store 128 for subsequent use by the monitoring module 122.

At operation 806, the remediation module 124 can determine remedial actions for issues associated with user devices using the data model. As described above, in at least one example, responsive to the occurrence of a trigger event, the remediation module 124 can perform one or more actions to prevent or correct an identified issue. In some examples, the one or more actions can be prescribed by a rule associated with the identified issue. In some examples, the one or more actions can be learned via a machine learning mechanism, as described herein. As such, a machine-trained data model can analyze the identified issue and can output a recommendation regarding one or more actions to perform to prevent and/or correct the identified issue.

In at least one example, the machine-trained data models described above with reference to FIGS. 7 and 8 can be updated over time. That is, the training module 126 can access updated data and can retrain such data models based on the updated data.

Figure 9:
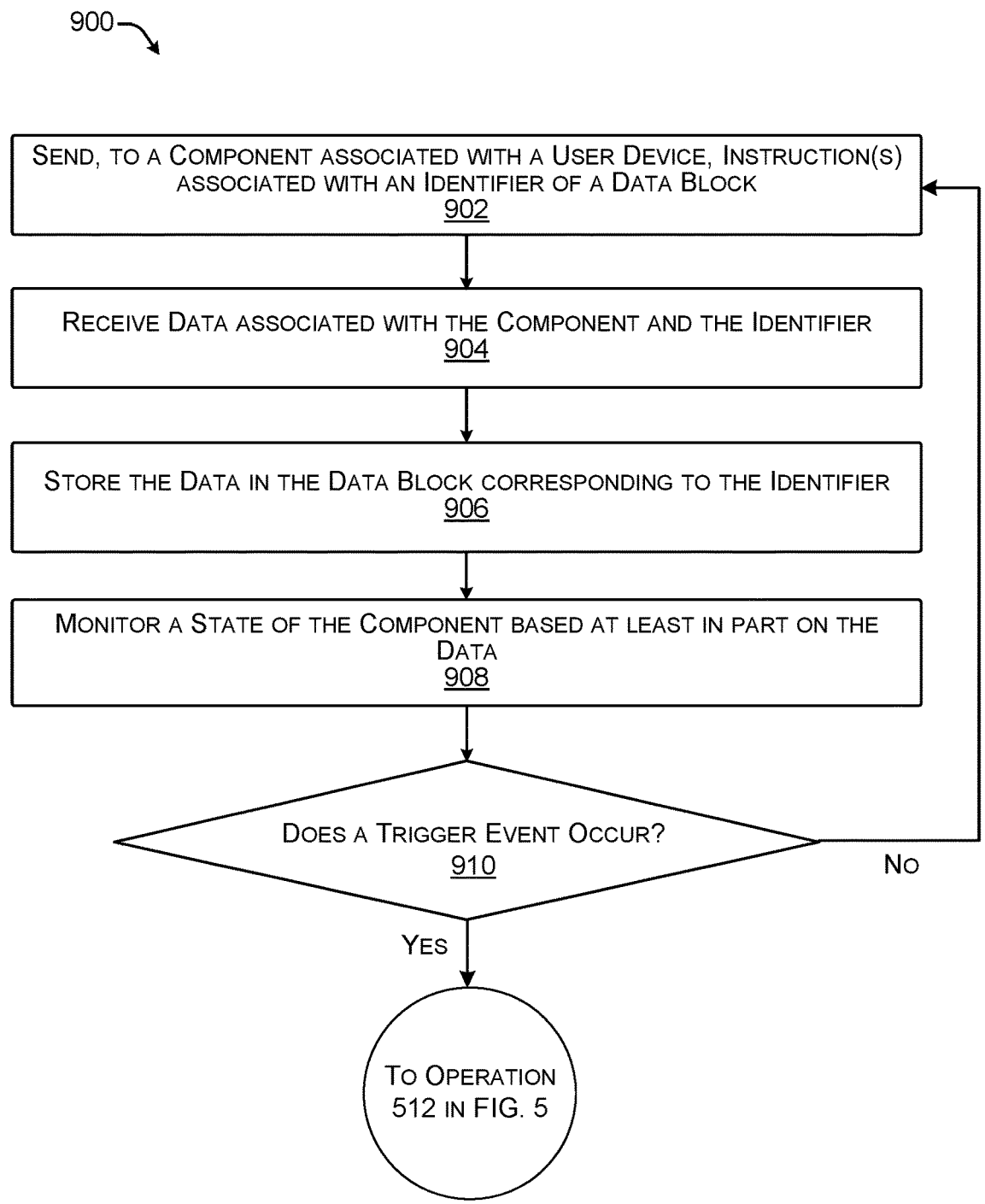
FIG. 9 illustrates an example process for monitoring a state of a user device using data received from a data block and/or effectuating a remedial action, as described herein.

FIG. 9 illustrates an example process 900 for monitoring a state of a user device using data received from a data block and/or effectuating a remedial action, as described herein. As described above, in some examples, entities, such as the entity 102, may want to limit the access of the monitoring service provider with respect to components of their computing infrastructure. In such examples, the monitoring module 122 can access data which can be written to data blocks, as described herein, and can collect data from such data blocks (e.g., via an API) instead of from the agent 130.

At operation 902, the monitoring module 122 can send, to a component 202A associated with a user device, instruction(s) associated with an identifier of a data block. As described above, in at least one example, the monitoring service provider can avail one or more data blocks 204 (individually, 204A-204M), which can be written to and/or read from the components 202. Each data block 204A-204M can be a light weight container that is associated with a unique identifier (e.g., a globally unique identifier). In at least one example, the monitoring module 122 can send, to the component 202A associated with a user device, instruction(s) that include an identifier associated with a particular data block (e.g., the data block 204A). In some examples, the instruction(s) can be sent directly to the component 202A. In other examples, the instruction(s) can be sent to the component 202A via the particular data block (e.g., the data block 204A).

At operation 904, data associated with the component 202A and the identifier can be received. In at least one example, the component 202A can send data to the data block 204A. In at least one example, the data can include data associated with the health of the component 202A and/or product(s)/service(s) associated with a cloud-based service provider, as described above. In some examples, the data can include an identifier (as provided by the instruction(s)) so that the data is written to the correct data block 204A. In at least one example, the data may be obscure such that may not be useful unless the meaning of the data is known. That is, the data itself may include a value or other indication that is meaningless to anyone who may intercept the data as it is transmitted to the data block 204A and/or stored by the data block 204A. This provides an added layer of security for enabling secure communications.

At operation 906, a data block corresponding to the identifier can store the data. The data block 204A can store the data and/or can send the data to the monitoring service provider server(s) 120 via an API. That is, the component 202A can write to the data block 204A and such data can be accessible by the monitoring service provider server(s) 120. By using the data blocks 204, the monitoring service provider server(s) 120 can access data from the components 202 without otherwise accessing the components 202 and/or other data associated therewith.

At operation 908, the monitoring module 122 can monitor a state of the component based at least in part on the data. As described above with reference to operation 508 of FIG. 5, in at least one example, the monitoring module 122 can analyze inputs (e.g., data received from the data block) to determine if/when a state of the user device changes. In some examples, the monitoring module 122 can analyze such inputs using one or more rules, which can be configured to monitor business scenarios and/or application scenarios. As described above, in at least one example, the one or more rules can be configurable. In at least one example, rules can be particular to products/services (e.g., availed by cloud-based service provider(s)), entities, users (e.g., characteristics associated therewith), geographic location, time of day, day of the week, date, and the like.

At operation 910, the monitoring module 122 determines whether a trigger event occurs. As described above, with reference to operation 510 of FIG. 5, in at least one example, a trigger event can be an event that prompts the monitoring module 122 to send a notification to the remediation module 124 regarding a state of the user device. Based at least in part on determining an occurrence of a trigger event, process 900 can proceed to operation 512, as described above with reference to FIG. 5. In some examples, if the monitoring module 122 does not determine that a trigger event occurs, process 900 can return to operation 906, where additional data can be received from the user device and the monitoring module 122 can continue to monitor the state of the user device.

In at least one example, the monitoring module 122 can utilize machine-trained data model(s) to monitor the state of the user device. In such an example, the machine-trained data model(s) can identify issue(s) based at least in part on the data received from the agent and/or recommend remedial action(s) to be taken. As such, in at least one example, process 900 can proceed from operation 908 to effectuating a remedial action and the remediation module 124 can effectuate the recommended remedial action(s) to be taken (e.g., without determining whether a trigger event occurs).

Figure 10:
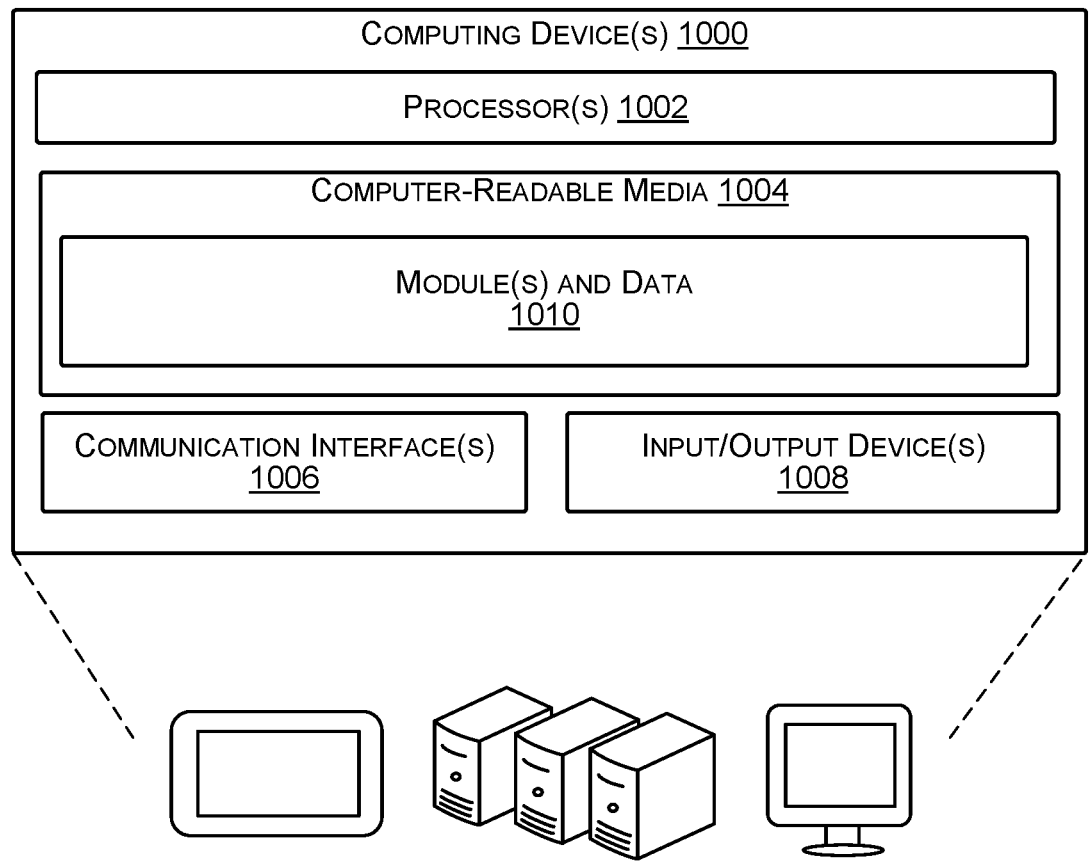
FIG. 10 illustrates an example computing device for performing techniques described herein.

FIG. 10 illustrates example computing device(s) 1000 for performing techniques described herein. The computing device(s) 1000 can correspond to the entity server(s) 106, user device(s) 108, the IT user device(s) 114, the cloud-based service provider server(s) 116, and/or the monitoring service provider server(s) 120. The computing device(s) 1000 can comprise user device(s) including, but not limited to, mobile phone(s), personal digital assistant(s), netbook(s), laptop computer (s), desktop computer(s), networked computer(s), and/or any another electronic device(s) that are capable of transmitting or receiving data), server computing device(s). In some examples, the computing device(s) 1000 can comprise server computing device(s) (e.g., server(s)), which can be any type of server, such as a network-accessible server. In some examples, the server(s) can be stand-alone computing systems, distributed-computing systems, networked-computing systems, etc. For instance, in at least one example, one or more of the functionalities described herein as being performed by the server(s) can be performed by a single device or multiple devices. In some examples, one or more of the functionalities described herein can be performed one or more remotely located devices instead of, or in addition to, the server(s).

In at least one example, the computing device(s) 1000 can include processor(s) 1002, computer-readable media 1004, communication interface(s) 1006, and input/output device(s) 1008.

The processor(s) 1002 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 1002 can execute one or more modules and/or processes to cause the computing device(s) 1000 to perform a variety of functionalities, as set forth above and explained in further detail in the following disclosure. Additionally, each of the processor(s) 1002 can possess its own local memory, which also can store program modules, program data, and/or one or more operating systems.

Depending on the exact configuration and type of the computing device(s) 1000, the computer-readable media 1004, can include computer storage media and/or communication media.

Computer storage media can include volatile memory, nonvolatile memory, and/or other persistent and/or auxiliary computer storage media, removable and non-removable computer storage media implemented in any method or technology for storage of data such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain data for access by a computing device.

In at least one example, the computer storage media can include non-transitory computer-readable media. Non-transitory computer-readable media can include volatile and nonvolatile, removable and non-removable tangible, physical media implemented in technology for storage of data, such as computer readable instructions, data structures, program modules, or other data. The computer-readable media 1004 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired data and which can be accessed by the computing device(s) 1000. Any such non-transitory computer-readable media can be part of the computing device(s) 1000.

In contrast, communication media includes computer readable instructions, data structures, program modules, or other data in a modulated data signal, such as a carrier wave, or other transmission mechanism. As defined herein, computer storage media does not include communication media.

In at least one example, the computer-readable media 1004 can store module(s) and data 1010. The module(s) and data 1010 can be in the form of stand-alone applications, productivity applications, an operating system component, or any other application or software module. For instance, if the computing device(s) 1000 correspond to the monitoring service provider server(s) 120, the module(s) and data 1010 can include the monitoring module 122, the remediation module 124, the training module 126, and the data store 128. Furthermore, if the computing device(s) 1000 correspond to the user device(s) 108, the module(s) and data 1010 can include the cloud-based application(s) 118 and the agent 130.

The communication interface(s) 1006 can include one or more interfaces and hardware components for enabling communication with various other devices, such as over network(s) or directly. For example, communication interface(s) 1006 can enable communication through one or more networks, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, low power area networks (LPWAN) or any other such network, or any combination thereof. Components used for such communications can depend at least in part upon the type of network, the environment selected, or both. Protocols for communicating over such networks are well known and will not be discussed herein in detail.

In at least one example, the one or more input/output (I/O) devices 1008 can include speakers, a microphone, a camera, a display, a haptic output device, various user controls (e.g., buttons, a joystick, a keyboard, a keypad, etc.), and so forth.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

Example Clauses

A: A system of a monitoring service for monitoring user experience associated with one or more cloud-based services availed via an entity, the system comprising: one or more processors; and one or more non-transitory computer readable media storing computer executable instructions that, when executed, cause the system to perform operations comprising: receiving, from a user device using a cloud-based service of the one or more cloud-based services, data associated with one or more components of the user device, wherein the data is indicative of a user experience of a user associated with the user device while using the cloud-based service, and wherein the user and the user device are associated with the entity; monitoring, using one or more rules and based at least in part on the data, a state of the user device; determining, based at least in part on the monitoring, a change to the state of the user device; and causing a notification to be presented via a computing device of a designated user, wherein the notification indicates the change to the state of the user device.

B: The system as paragraph A recites, wherein the user device is one of a plurality of user devices associated with the entity, and the operations further comprise: determining state changes to a number of user devices of the plurality of user devices; determining that the number of user devices meets or exceeds a threshold; and causing the notification to be presented via the computing device is responsive to determining that the number of user devices meets or exceeds the threshold.

C: The system as paragraph A or B recites, wherein the one or more rules are associated with at least one condition, and the operations further comprise: determining, based at least in part on the data, that the at least one condition is satisfied; and determining the change to the state of the user device responsive to determining that the at least one condition is satisfied.

D: The system as any of claims A-C recites, wherein the data is received from a software agent running as a background process on the user device.

E: The system as any of claims A-D recites, wherein the designated user is a technical support representative of the entity associated with the user device or a representative associated with the monitoring service.

F: The system as any of claims A-E recites, wherein the one or more rules are determined based at least in part on one or more of (i) the cloud-based service, (ii) the entity, or (iii) a characteristic of the user of the user device.

G: The system as any of claims A-F recites, wherein the one or more rules are generated using a machine learning mechanism.

H: A method, implemented at least in part by one or more server computing devices of a monitoring service for monitoring user experience associated with one or more cloud-based services availed via an entity, the method comprising: receiving, from a user device using a cloud-based service of the one or more cloud-based services, data associated with one or more components of the user device, wherein the data is indicative of a user experience associated with the user device while using the cloud-based service, and wherein the user device is associated with the entity; monitoring, using one or more rules and based at least in part on the data, changes to a state of the user device; determining, based at least in part on the monitoring, an occurrence of a trigger event; and determining an output associated with the trigger event, wherein the output causes one or more remedial actions to be performed.

I: The method as paragraph H recites, wherein the output comprises causing a notification to be presented via a computing device of a designated user, the notification indicating a change to the state of the user device.

J: The method as paragraph H or I recites, wherein the one or more remedial actions are performed automatically by the one or more server computing devices.

K: The method as any of claims H-J recites, wherein a rule of the one or more rules is associated with a condition and the method further comprises: determining, based at least in part on the data, that the condition is satisfied; and determining the occurrence of the trigger event based at least in part on determining that the condition is satisfied.

L: The method as any of claims H-K recites, wherein the one or more rules are respectively associated with one or more conditions and the method further comprises determining the occurrence of the trigger event based at least in part on determining that more than a threshold number of the one or more conditions are satisfied.

M: The method as any of claims H-L recites, wherein the state of the user device is associated with a value and the method further comprises determining the occurrence of the trigger event based at least in part on a relationship of the value and a threshold value.

N: The method as any of claims H-M recites, wherein the data is received from a software agent running as a background process on the user device.

O: The method as any of claims H-N recites, wherein the one or more rules are determined based at least in part on one or more of (i) the cloud-based service, (ii) the entity, or (iii) a characteristic of a user of the user device.

P: The method as paragraph O recites, wherein the data is associated with an identifier and the method further comprises: identifying the user based at least in part on the identifier; and determining the one or more remedial actions based at least in part on the identity of the user.

Q: The method as any of claims H-P recites, further comprising receiving, from the user device and at a substantially regular interval of time, additional data associated with the one or more components of the user device, wherein the data and the additional data are received securely and in near real-time.

R: One or more non-transitory computer readable media storing computer executable instructions that, when executed, cause one or more processors of a monitoring service for monitoring user experience associated with one or more cloud-based services to perform operations comprising: receiving, from a user device using a cloud-based service, data associated with one or more components of the user device, wherein the data is indicative of a user experience associated with the user device while using the cloud-based service, and wherein the user device is associated with an entity availing the cloud-based service; monitoring, using one or more rules and based at least in part on the data, changes to a state of the user device; determining, based at least in part on the monitoring, an occurrence of a trigger event associated with a remedial action; and effectuating the remedial action.

S: The one or more instructions as paragraph R recites, the operations further comprising: prior to receiving the data from the user device: receiving a request to add the user device to the monitoring service; and providing, to the user device, a software agent to be downloaded to the user device, wherein the software agent runs as a background process on the user device; and receiving the data from the software agent at substantially regular intervals of time.

T: The one or more instructions as paragraph R or S recites, wherein the one or more rules are determined based at least in part on one or more of (i) the cloud-based service, (ii) the entity, or (iii) a characteristic of a user of the user device.

U: A system associated with a monitoring service monitoring user experience associated with one or more cloud-based services availed by one or more entities, the system comprising: one or more processors; and one or more non-transitory computer readable media storing computer executable instructions that, when executed, cause the system to perform operations comprising: providing one or more instructions to a component associated with an entity of the one or more entities, wherein the one or more instructions are associated with an identifier corresponding to a data block of a plurality of data blocks associated with the system; receiving, from the component, data indicative of a state of the component, wherein the data is associated with the identifier; storing the data in the data block corresponding to the identifier; and monitoring, using one or more rules, changes to the state of the component based at least in part on the data in the data block.

V: The system as paragraph U recites, wherein the component is a computing device or a process.

W: The system as paragraph U or V recites, wherein the data is further indicative of a user experience associated with the component while using a cloud-based service of the one or more cloud-based services monitored by the system.

X: The system as any of claims U-W recites, the operations further comprising: determining, based at least in part on the monitoring, an occurrence of a trigger event associated with a remedial action; and effectuating the remedial action.

Y: The system as any of claims U-X recites, wherein the data block is configured for at least the component to read from or write to the data block.

Z: The system as any of claims U-Y recites, the operations further comprising receiving, after a lapse of a period of time, updated data from the component.

AA: The system as any of claims U-Z recites, wherein the component and additional data associated with the component are inaccessible to the system.

AB: The system as any of claims U-AA recites, wherein the component is remotely located from the system and the data is transmitted via a secure network connection.

AC: A computer-implemented method comprising: providing one or more instructions to a component associated with an entity, wherein the one or more instructions are associated with an identifier corresponding to a data block of a plurality of data blocks associated with a system of a service provider for monitoring cloud-based services availed by the entity; receiving, from the component, data indicative of a state of the component, wherein the data is associated with the identifier; storing the data in the data block associated with the identifier; and monitoring, using one or more rules, changes to the state of the component based at least in part on the data in the data block.

AD: The computer-implemented method as paragraph AC recites, further comprising sending additional data associated with the data block to at least one of the component or another component.

AE: The computer-implemented method as paragraph AC or AD recites, further comprising receiving additional data from the component at substantially regular intervals of time.

AF: The computer-implemented method as paragraph AE recites, further comprising generating a log of changes to the data based at least in part on the additional data received at the substantially regular intervals of time.

AG: The computer-implemented method as any of claims AC-AF recites, wherein the component is configured to transmit the data to the data block via a network connection, the computer-implemented method further comprising receiving the data associated with the component after restoration of an unavailable network connection.

AH: The computer-implemented method as any of claims AC-AG recites, further comprising determining that the component satisfies a security condition prior to storing the data in the data block.

AI: The computer-implemented method as any of claims AC-AH recites, further comprising: determining, based at least in part on the monitoring, an occurrence of a trigger event associated with a remedial action; and effectuating the remedial action.

AJ: The computer-implemented method as any of claims AC-AI recites, wherein the data is received via an Application Programming Interface (API) that enables the system to access the data without accessing at least one of the component or additional data associated with the component.

AK: One or more non-transitory computer readable media storing computer executable instructions that, when executed, cause one or more processors to perform operations comprising: providing one or more instructions to a component associated with an entity, wherein the one or more instructions are associated with an identifier corresponding to a data block of a plurality of data blocks associated with a system of a service provider for monitoring cloud-based services availed by the entity; receiving, from the component, data associated with the component, wherein the data is associated with the identifier and is indicative of a state of the component; storing the data in the data block; and monitoring, using one or more rules, changes to the state of the component based at least in part on the data in the data block.

AL: The one or more computer-readable instructions as paragraph AK recites, the operations further comprising receiving additional data from the component at substantially regular intervals of time.

AM: The one or more computer-readable instructions as paragraph AK or AL recites, the operations further comprising: determining, based at least in part on the monitoring, an occurrence of a trigger event associated with a remedial action; and effectuating the remedial action.

AN: The one or more computer-readable instructions as any of claims AK-AM recites, wherein the data is received via an Application Programming Interface (API) that enables the system to access the data without accessing at least one of the component or additional data associated with the component.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer readable media storing computer executable instructions that, when executed, cause the system to perform operations comprising:
receiving, from a user device of a plurality of user devices using a cloud-based service availed by an entity, data associated with one or more components of the user device;
based at least in part on a user identifier associated with the data, determining an identity of a user associated with the user device;
monitoring, using one or more rules and based at least in part on the data, a state of the user device;
determining, based at least in part on the monitoring, a change from a first state of the user device to a second state of the user device;
training a predictive model using training data comprising a plurality of historical remedial actions associated with respective changes of state of individual user devices of the plurality of user devices;
at least partly responsive to determining the change from the first state of the user device to the second state of the user device, determining one or more remedial actions based at least in part on the identity of the user and the predictive model; and
causing performance of the one or more remedial actions.

2. The system as claim 1 recites, the operations further comprise:
determining state changes to a quantity of user devices of the plurality of user devices;
determining that the quantity of user devices meets or exceeds a threshold; and
causing the performance of the one or more remedial actions responsive to determining that the quantity of user devices meets or exceeds the threshold.

3. The system as claim 1 recites, wherein the one or more rules are associated with at least one condition, and the operations further comprise:
determining, based at least in part on the data, that the at least one condition is satisfied; and
determining the change to the state of the user device responsive to determining that the at least one condition is satisfied.

4. The system as claim 1 recites, wherein the one or more rules are determined based at least in part on one or more of (i) the cloud-based service, (ii) the entity, or (iii) a characteristic of the user.

5. The system as claim 1 recites, wherein causing the performance of the one or more remedial actions comprises causing a notification to be presented via a computing device of a designated user, wherein the notification indicates the change to the state of the user device.

6. The system as claim 5 recites, wherein the designated user is a technical support representative of the entity associated with the user device or a representative associated with the system.

7. The system as claim 1 recites, wherein the predictive model comprises a first predictive model, and wherein the one or more rules are generated using a second predictive model.

8. A method comprising:
receiving, from a user device of a plurality of user devices using a cloud-based service availed by an entity, data associated with one or more components of the user device;
monitoring, using one or more rules and based at least in part on the data, changes to a state of the user device;
based at least in part on a user identifier associated with the data, determining an identity of a user associated with the user device;
determining, based at least in part on the monitoring, an occurrence of a trigger event;
training a predictive model using training data comprising a plurality of historical outputs associated with respective trigger events that occurred at individual user devices of the plurality of user devices;
at least partly responsive to determining the trigger event, determining an output associated with the trigger event, wherein the output is based at least in part on the identity of the user and the predictive model; and
based at least in part on the output, causing one or more remedial actions to be performed.

9. The method as claim 8 recites, wherein the method is performed by one or more server computing devices and the one or more remedial actions are performed automatically by the one or more server computing devices.

10. The method as claim 8 recites, wherein a rule of the one or more rules is associated with a condition and the method further comprises:
determining, based at least in part on the data, that the condition is satisfied,
wherein determining the occurrence of the trigger event is based at least in part on determining that the condition is satisfied.

11. The method as claim 8 recites, wherein the one or more rules are respectively associated with one or more conditions and the method further comprises determining the occurrence of the trigger event based at least in part on determining that more than a threshold quantity of the one or more conditions are satisfied.

12. The method as claim 8 recites, wherein the state of the user device is associated with a value and the method further comprises determining the occurrence of the trigger event based at least in part on a relationship of the value and a threshold value.

13. The method as claim 8 recites, further comprising receiving, from the user device, additional data associated with the one or more components of the user device, wherein the data and the additional data are received securely and in near real-time.

14. The method as claim 13 recites, wherein at least one of the data or the additional data are received at a regular interval of time.

15. The method as claim 8 recites, wherein the one or more rules are determined based at least in part on one or more of (i) the cloud-based service, (ii) the entity, or (iii) a characteristic of the user.

16. The method as claim 8 recites, wherein causing the performance of the one or more remedial actions comprises at least one of causing the user device to reboot, causing the user device to perform a scan for viruses, or causing the user device to perform a scan for software versions.

17. One or more non-transitory computer readable media storing computer executable instructions that, when executed, cause one or more processors to perform operations comprising:
receiving, from a user device of a plurality of user devices using a cloud-based service availed by an entity, data associated with one or more components of the user device;
based at least in part on a user identifier associated with the data, determining an identity of a user associated with the user device;
monitoring, using one or more rules and based at least in part on the data, changes to a state of the user device;
determining, based at least in part on the monitoring, an occurrence of a trigger event;
training a predictive model using training data comprising a plurality of historical remedial actions and a plurality of historical trigger events;
at least partly responsive to determining the occurrence of the trigger event, determining a remedial action based at least in part on the identity of the user and the predictive model; and
effectuating the remedial action.

18. The one or more non-transitory computer readable media as claim 17 recites, wherein receiving the data from the user device comprises receiving the data from a software agent provided by the cloud-based service, wherein the software agent runs as a background process on the user device.

19. The system as claim 1 recites, wherein causing the performance of the one or more remedial actions comprises at least one of causing the user device to reboot, causing the user device to perform a scan for viruses, or causing the user device to perform a scan for software versions.

20. The one or more non-transitory computer readable media as claim 17 recites, wherein effectuating the remedial action comprises at least one of causing the user device to reboot, causing the user device to perform a scan for viruses, or causing the user device to perform a scan for software versions.

* * * * *